(12) United States Patent
Emerson et al.

(10) Patent No.: US 7,992,145 B2
(45) Date of Patent: Aug. 2, 2011

(54) MULTILEVEL TICKET-BASED JOB MANAGEMENT ARCHITECTURE FOR COMPUTING DEVICES

(75) Inventors: Daniel Floyd Emerson, Redmond, WA (US); Benjamin J. Kuhn, Bellevue, WA (US); Amanda Giang-Tien Nguyen, Redmond, WA (US); Feng Yue, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1385 days.

(21) Appl. No.: 10/794,669

(22) Filed: Mar. 5, 2004

(65) Prior Publication Data
US 2005/0210227 A1    Sep. 22, 2005

(51) Int. Cl.
*G06F 9/455* (2006.01)
(52) U.S. Cl. ......................................................... 718/100
(58) Field of Classification Search ................ 718/1, 100
See application file for complete search history.

(56) References Cited

U.S. PATENT DOCUMENTS

| 4,556,959 | A | 12/1985 | Allen et al. |
| 5,869,824 | A | 2/1999 | Okada et al. |
| 6,002,814 | A | 12/1999 | Chadez |
| 6,883,981 | B2 * | 4/2005 | Kizaki et al. .................... 400/76 |
| 6,976,257 | B2 * | 12/2005 | Leymann et al. ............. 718/103 |
| 2005/0179921 | A1 * | 8/2005 | Brossman et al. ........... 358/1.13 |

* cited by examiner

*Primary Examiner* — Meng A An
*Assistant Examiner* — Mengyao Zhe
(74) *Attorney, Agent, or Firm* — Lee & Hayes, PLLC

(57) ABSTRACT

A job completion architecture, includes content that is specified as a hierarchical tree of related content units and a set of multilevel tickets associated with instances of the hierarchically arranged content units. The job manager applies the multilevel tickets, specifying property settings at potentially multiple levels within the hierarchical tree, according to a qualified inheritance rule wherein settings applicable to a set of lower level properties that are specified within a first (higher level) ticket are incorporated into the merged settings to the extent a second (lower level) ticket does not specify settings for the set of lower level properties. If a same property is specified in both a higher and lower level ticket, during merging a setting specified in the lower level ticket overrides the higher level ticket setting.

27 Claims, 14 Drawing Sheets

Job Execution In Multi-filter Path

Job Execution In Multi-filter Path

| Feature Descriptor Components | |
|---|---|
| 400 | Feature Descriptor Name |
| 402 | Filter Path |
| 404 | Feature Property Tree |
| 406 | Constraints |
| 408 | Default Job Ticket |

Print Job Functions

| | |
|---|---|
| 600 | Filter Execution Ordering |
| 610 | Pass-though Filtering |
| 620 | Pre-Flight Job Ticket |
| 630 | Filter Priority |
| 640 | Feature Completion Communication |

FIG. 6

Feature Descriptor Schema

| | |
|---|---|
| 700 | Name |
| 702 | Description |
| 704 | Filters |
| 706 | Status |
| 708 | Action Needed |

FIG. 7

Filter Execution Schema

| | |
|---|---|
| 800 | Job Status |
| 802 | Current Filter Name |
| 804 | Current Filter Status |

FIG. 8

Job Ticket Interface/Schema

| | |
|---|---|
| 1000 | Create Job Ticket |
| 1010 | Delete Job Ticket |
| 1020 | Open Job Ticket |
| 1030 | Set Property/Data |
| 1040 | Get Property/Data |
| 1050 | Enumerate Property/Data |
| 1060 | Create Property/Data |
| 1070 | Delete Property/Data |
| 1080 | Validate Job Ticket |

FIG. 10

Feature Property Interface

| | |
|---|---|
| 1100 | Get Feature Property Tree |
| 1110 | Set Property/Data |
| 1120 | Get Property/Data |
| 1130 | Enumerate Property/Data |
| 1140 | Create Property/Data |
| 1150 | Delete Property/Data |

FIG. 11

Parser Interface

| | |
|---|---|
| 1200 | Register |
| 1210 | Get Parsed Filter Tree |
| 1220 | Set Configuration |
| 1230 | Enumerate Entries |
| 1240 | Enumerate Construct Instances |
| 1250 | Get Recent Values |
| 1260 | Get Values |

FIG. 12

Filter Interface

| | |
|---|---|
| 1300 | Initialize |
| 1310 | Register Data |
| 1320 | Delete Filter |

FIG. 13

Print Schema Categories

| | |
|---|---|
| 1400 | Page Layout |
| 1410 | Rendering |
| 1420 | Finishing |
| 1430 | Output |
| 1440 | Document Information |
| 1450 | Job Information |
| 1460 | Printer Information |
| 1470 | Driver Information |
| 1480 | Port Information |
| 1490 | Monitor (Device Adaptor) Information |
| 1492 | Communication Information |
| 1494 | Configuration Information |
| 1496 | Alert Information |
| 1498 | Consumables Information |
| 1499 | Maintenance Information |

FIG. 14

MULTILEVEL TICKET-BASED JOB MANAGEMENT ARCHITECTURE FOR COMPUTING DEVICES

FIELD OF THE INVENTION

The present invention relates generally to computing devices. More particularly, the present invention relates to methods and computer system components that maintain device configurations/definitions and manage job processing, and more particularly print job processing, in computing devices according to the device configurations/definitions.

BACKGROUND OF THE INVENTION

Current print architectures comprise a layered set of components. In particular, in the context of the WINDOWS operating system, applications carry out print-related requests (e.g., configuration, execution, status, etc.) by communicating such requests, in the form of WIN32 API commands, to the graphics device interface (GDI) and print spooler of the operating system. The operating system (either directly or via a spooler), on behalf of the applications, passes the requests on to a printer driver associated with a particular installed printer.

The printer driver, associated with a particular installed printer type/personality, consists of dynamic-link libraries (DLLs) including a configuration/user interface module and a rendering module. The configuration/user interface module reports printer device capabilities and enables an application to obtain and designate values for configurable print parameters for a particular printer. The configuration/user interface module builds user interface related data for the application and enables a user to designate values for the configurable parameters. The configuration (e.g., settings) of a print job are stored within a known DEVMODE data structure. The printer driver handles the manipulation and validation of entries in the DEVMODE structure for the particular print job. When processing print requests initiated by an application, the rendering module generates raw device commands for submission to the printer device to render printed documents based upon the contents of the DEVMODE and a submitted input print file.

The printer drivers, in the known print architectures, stand alone with respect to other print drivers and print-related components in a system. Thus, for a set of six distinct printer types (personalities)—even for a same printer device, six distinct printer drivers are installed on a computer system. It is noted that different printer devices can share the same driver. The printer drivers are provided in binary format and are generally neither editable nor extensible by users/administrators. Upgrading a previously installed printer driver is accomplished by replacing an old driver by a new one.

Under the current printer architecture, extending configurable features is limited to the device driver. The DEVMODE data structure, that provides information about print settings associated with a print job, is extended exclusively by the associated print driver. Thus, a DEVMODE cannot be extended to incorporate additional features supported by applications or print system components (other than the device driver).

Yet another characteristic of the printer driver-based print architectures is the existence of multiple print queues. In particular, a queue is maintained for each printer/personality combination. Thus, a separate queue is established for each personality of a multiple personality printer device. A result of this arrangement is the absence of a single user interface providing the status of all pending jobs to all printer/personality combinations to a multiple personality device.

The above described printer driver dominated printer architecture places a majority of the responsibility for printer code development in the hands of printer hardware providers. However, placing too much responsibility in the hands of the hardware providers has reduced the flexibility and extensibility of the base capabilities of the provided drivers. The known print system architecture inhibits uniformity in treating print features. The known print architectures potentially lead to duplicated/overlapping functionality provided by independent components of the existing print architecture.

Another aspect of print job processing in known systems is the relative difficulty encountered when seeking to change job settings within a job, a document, etc. Designating property settings during the course of executing a print job tends to be linear. Once specified, property settings persist on a job consumer until a new settings are specified to the consumer. In a particular example of such linear approaches to specifying job settings, when a print job is submitted by an application, print properties assigned to the job persist throughout each page of each document contained within the job until new settings are designated. Thus, if a landscape orientation option is selected for only part of a print job, then the landscape property is specified at the beginning of the landscape orientation stage of the print job and persists until a new set of settings specify portrait orientation for the job. Furthermore, in known print systems, an entire device mode, not just a changed property, must be specified when changing any single property setting.

SUMMARY OF THE INVENTION

The job management/execution architecture disclosed herein addresses the absence of flexibility exhibited by other systems that rely upon job-wide property value designations to drive completion of a particular request—without the ability to re-designate such property values on a local level. The present invention comprises a job management framework, embedded as computer-executable instructions and data structures in a computer system, for managing operations executed by output devices having potentially multiple distinct personalities. More specifically, the job management framework comprises a set of hierarchically arranged content units including at least a first content unit at a first hierarchical level and a second content unit at second hierarchical level, wherein the first hierarchical level is higher than the second hierarchical level. A set of multilevel tickets identify a set of properties to be applied by the job manager during execution of an operation.

Furthermore, a job manager includes executable instructions for performing a series of steps relating to processing the multiple job tickets associated with different levels of a content tree. The steps include merging a first ticket associated with the first content unit and a second ticket associated with the second content unit to render merged settings applicable to at least the second content unit. The merging operation is governed at least by a qualified inheritance rule wherein settings applicable to a set of second level properties that are specified within the first ticket are incorporated into the merged settings to the extent the second ticket does not specify settings for the set of second level properties. Thereafter, the merged settings are applied to the second content unit.

The present invention is also incorporated into a new multilevel job ticket for specifying property settings applicable to content associated with an operation performed by a computing system. The multilevel job ticket comprises a set of ticket elements. Each of the ticket element specifies: a level identifier specifying a level of a set of levels supported by the ticket, a property identifier, and a setting value for a property associated with the property identifier.

The present invention also comprises a method, and a computer-readable medium including executable instructions, for processing jobs by the above-summarized job management framework according to multi-level tickets.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 6 summarizes a set of functions/tasks performed by a print manager embodying the present invention;

FIG. 7 summarizes the tagged fields of an exemplary feature descriptor schema for carrying out an embodiment of the present invention;

FIG. 8 summarizes the tagged fields of an exemplary filter execution schema for carrying out ticket execution in accordance with an embodiment of the present invention;

FIG. 10 identifies methods/operations of an exemplary ticket interface/schema;

FIG. 11 identifies methods/operations of an exemplary feature property interface;

FIG. 12 identifies methods/operations of an exemplary parser interface;

FIG. 13 identifies methods/operations of an exemplary filter interface;

FIG. 14 identifies a set of exemplary categories of a print schema facilitating conveying information between the components of a print system embodying the present invention;

DETAILED DESCRIPTION OF THE DRAWINGS

The present invention is embodied, by way of example, within a print architecture built around a print manager executing within a computing device capable of rendering print requests to a communicatively coupled printer (or networked print server). The print manager accesses: a print request, including hierarchically arranged print content (e.g., job, documents, and pages), a set of multilevel tickets, and print content/ticket associations. Thereafter, for each page, the print manager merges applicable ones of the multilevel tickets to generate a set of properties/features for the page.

In accordance with an illustrative embodiment of the invention, the merging operation is performed in accordance with hierarchical relationships specified between the tickets ("content processing metadata") and hierarchically arranged print content.

Finally, while the present invention is described with reference to a print system, in alternative embodiments of the invention, the disclosed architecture is incorporated into any one of a variety of job processing engines/platforms, including other graphical output subsystems that render output, by way of example, to multi-function peripherals (MFPs), scanners, facsimile machines, etc.

Figure 1:
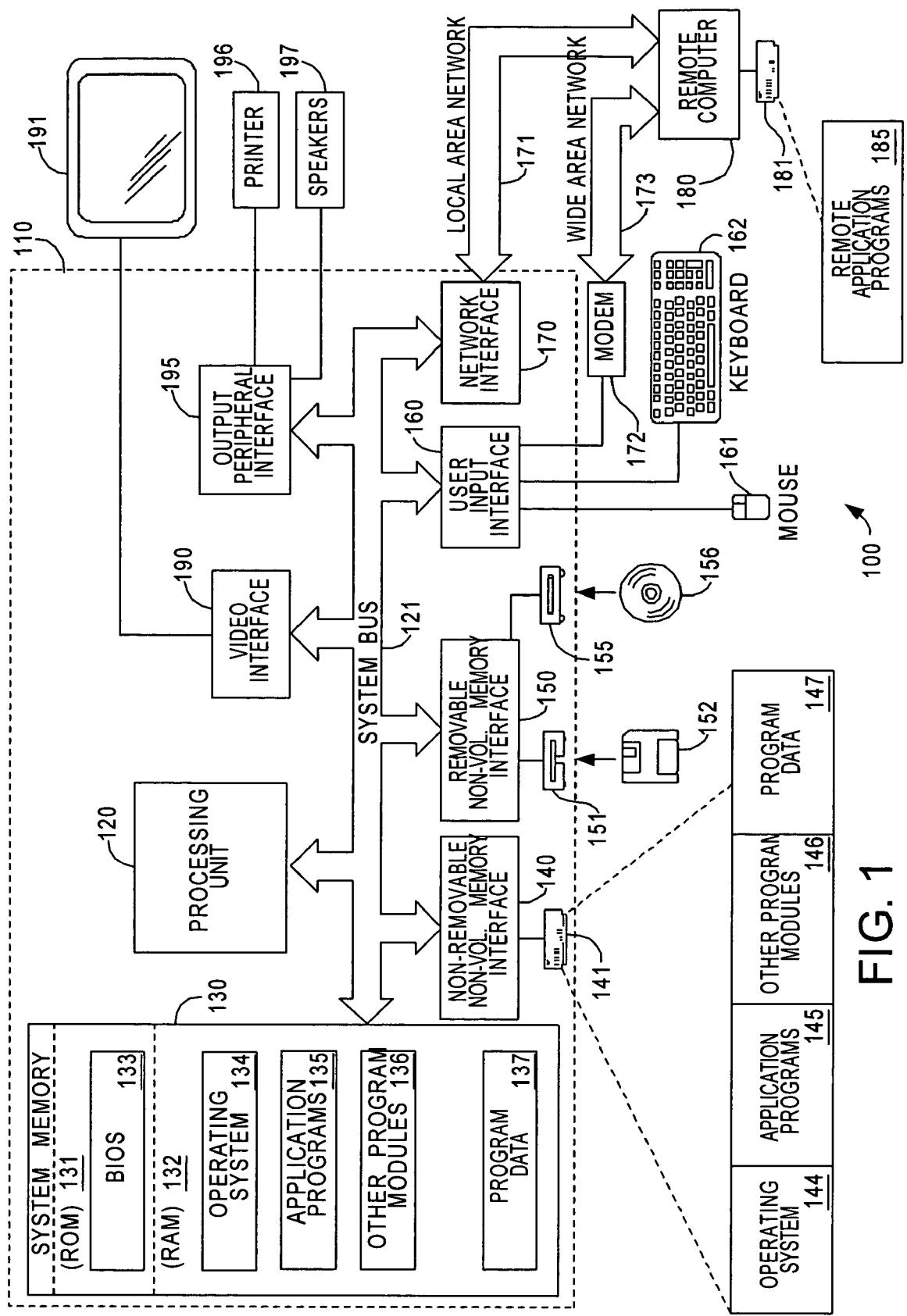
FIG. 1 is a block diagram depicting an exemplary computer system for carrying out an embodiment of the invention.

FIG. 1 illustratively depicts an example of a suitable operating environment 100 for carrying out a print manager-based print architecture incorporating hierarchical processing of multilevel tickets in accordance with the present invention. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, laptop/portable computing devices, hand-held computing devices, multiprocessor systems, microprocessor-based systems, network PCs, minicomputers, mainframe computers, distributed computing environments that include any of the above systems or devices, and the like. The disclosed job management framework enables a number of diverse interests to be served including flexibility, extensibility, integration, and uniformity with regard to the printing functionality of a computing system supported by an operating system and associated application and driver/filter components.

The invention is described in the general context of a set of steps and processes carried out by computer-executable instructions, such as program modules, being executed by a computer. Generally, program modules include routines, programs, objects, components, data structures, etc. that perform particular tasks or implement particular abstract data types. Though the exemplary embodiment is described with reference to locally executed processes on a single computer system, the invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is sometimes stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

The computer 110 potentially operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
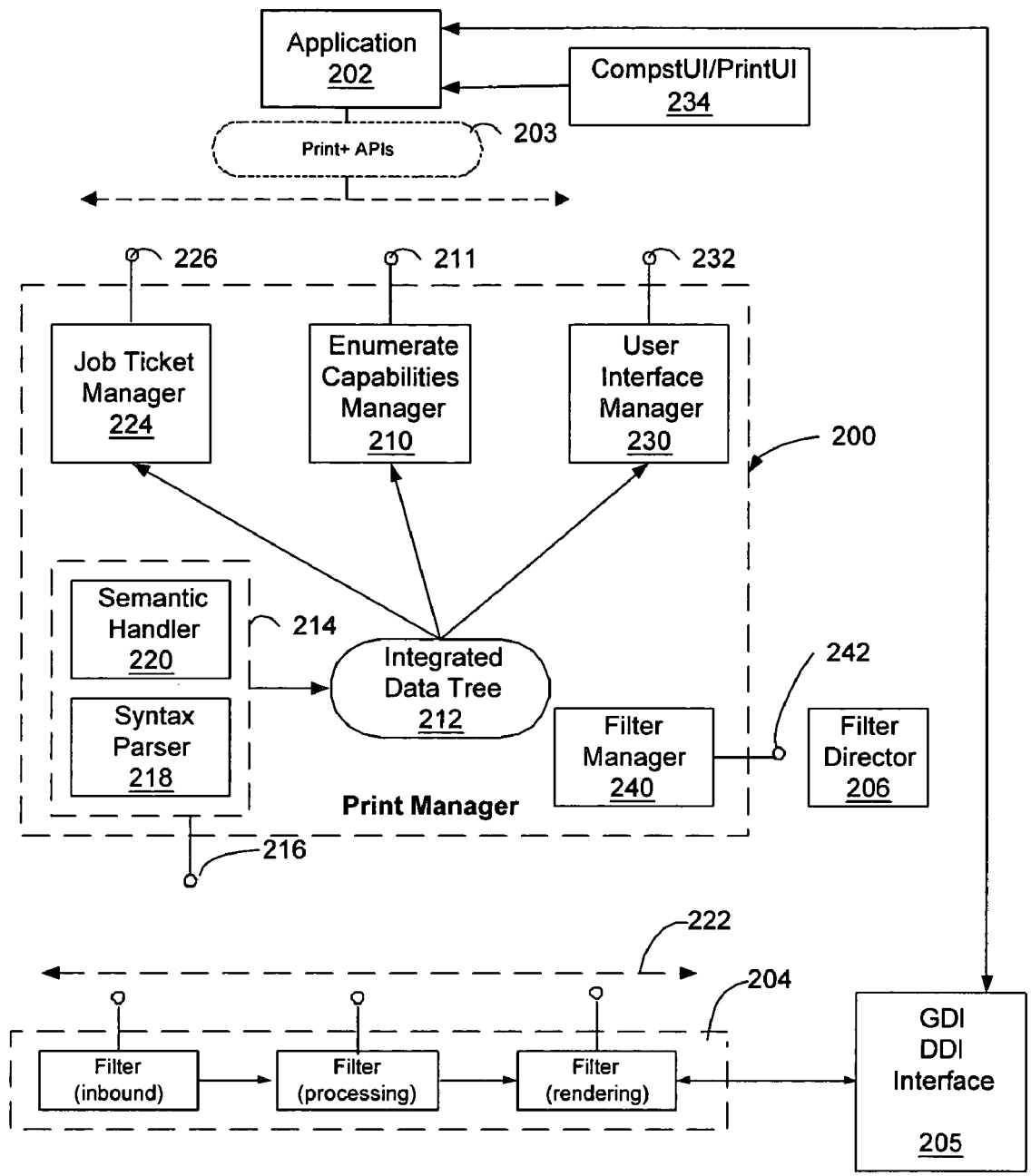
FIG. 2 is a high level schematic diagram depicting the primary components of a print system for carrying out printer management functionality in a computing system embodying the present invention.

FIG. 2 is a high level schematic diagram identifying components of a print sub-system incorporating an exemplary print manager-based print architecture embodying the present invention. A print manager 200 encapsulates the features/functionalities previously provided by print drivers and associated print components and presents an application 202 with one centralized interface to communicate user interface, job ticket and device feature information. The print manager 200 achieves these capabilities through a combination of specialized managers, discussed herein below, that communicate via standardized interfaces with: the application 202, a set of filters 204 that perform particular print request execution functions including a "rendering" function corresponding to the primary functionality previously rendered by a print driver (i.e., converting a print request into printer commands and data consumable by a particular printer type/personality), and a filter director 206 that controls the execution of print requests by the set of filters 204. In embodiments of the invention, the interfaces are at least partially schema driven. However, alternative embodiments implement other interface architectures. One such exemplary alternative is a component object model (COM) interface.

The print manager 200 and application 202 also communicate through the previously existing and well known MICROSOFT WINDOWS operating system Print+ APIs 203 or any other suitable functions/methods in accordance with alternative embodiments of the invention.

The presence of the print manager 200, in an embodiment of the present invention, augments the previously existing GDI/DDI interfaces 205 (and future generation print APIs). Thus, in the case of applications that are unaware of the print manager 200, the print functionality is carried out in accordance with legacy print system protocols and operations.

The print manager 200 includes an enumerate capabilities manager 210 that is responsible for providing access by the application 202, via a feature property interface 211, to an enumeration of the print capabilities (or "features") of a designated device/queue. The designated print queue integrates all the printer/personality combinations supported by the printer manager 200 for a device. It is the application 202's responsibility to provide any appropriate user interface for presenting the capabilities information rendered by the enumerate capabilities manager 210. Alternatively, the application 202 uses a user interface provided by a user interface manager 230 described herein below. The print capabilities are also referred to herein as "feature properties" and associated "values." The feature properties and values are stored in a feature descriptor that stores a filter pipeline and its associated feature properties/values. In an embodiment of the invention, the feature descriptor is stored, along with other feature descriptors within an integrated print configuration data tree 212 container or other suitable data structure.

In an embodiment of the invention, the set of feature properties includes a super set of capabilities (e.g., augmenting the functional capabilities provided by the Win32 device). In contrast to prior known generic printer descriptions (GPDs) that limit device capability definitions to a particular associated device (defined by a particular rendering filter), the feature properties are applicable to any filter associated with a particular print queue.

In an embodiment of the invention, feature properties consist of the features supported by a print queue and any limitations/constraints on the features' availability. For example, a feature property specifies that a printer device supports multiple copies, but also specifies the condition that the multiple copies feature is available only if a hard disk is installed on the printer device associated with the print queue for which the feature property is specified.

In contrast to the known device driver-based capabilities printer architecture, the integrated print configuration data tree 212 (or other suitable data structure) is accessible by the enumerate capabilities manager 210 and supports integrating printer functionality reported from multiple sources (e.g., filters) associated with printer functions. The integrated feature property data stored within the data tree 212 is accessible by the application 202 via the print manager 200. The enumerate capabilities manager 210 provides centralized reporting to the application 200 of feature properties stored in the data tree 212 for a device. It is further noted that a device can have any number of feature descriptors (personalities), but a particular device (and associated queue) has only one active feature descriptor for any particular job.

The print manager 200 allows a filter identified in a given feature descriptor to register features supported by the filter (e.g., scaling). In an embodiment of the invention, the print manager 200 receives filter features via a features data file syntax parser and semantic handler 214. A parser interface 216, exposed by a syntax parser functionality 218, comprises a set of methods enabling any one of the filters 204 to register its features via a supported data file (e.g., generic printer description (GPD), generic description language (GDL), PostScript Printer Description (PPD), etc.). The features data file parser and semantic handler 214 extracts the relevant feature descriptions and stores the features in the integrated data tree 212 (also referred to as a feature property tree) that describes the capabilities of a given printer queue. Any time the application 202 queries the print manager 200 for capabilities of a particular print queue, the enumerate capabilities manager 210 provides access to the combined/integrated printer queue features maintained by the data tree 212.

In accordance with embodiments of the present invention, the print manager 200 supports pipelining multiple filters of the set of filters 204. As a consequence, there is the potential for different ones of the filters 204 to duplicate features or provide overlapping features. For example, multiple filters in the pipelined filter path defined for a particular print queue support a Watermark feature and thus duplicate that feature. In an example of duplicated and overlapping features, multiple filters in a filter pipeline support N-up (n pages per printed sheet) page consolidation. However, one filter supports 1, 2, and 4 pages while another filter supports 1, 2, 4, 6, 9, and 16 pages per sheet. This is considered overlapping options as well as duplication of a feature since the duplication is not identical.

In an embodiment of the invention, the printer manager 200 attempts to resolve duplicated and overlapping features supported by filters in a particular filter path/pipeline. In the event the duplicated features are recognized by the print manager 200 (e.g., defined in a print schema defined for the print manager 200), the print manager 200 keeps/presents only one representation of a duplicated feature and merges any overlapping options. The resolved/unified feature set is maintained within the integrated data tree 212 by the print manager 200 such that the duplicated/overlapping features provided by the filters of a designated filter pipeline are transparent to the application 202.

In an embodiment of the invention, when a print job is rendered according to designated feature properties/values for a particular filter pipeline, the print manager 200 resolves the duplicated/overlapping features to select the appropriate filter to execute a particular feature. Thereafter, the print manager 200 builds filter-specific job tickets embodying the resolved feature determinations. The filter-specific job tickets are built based upon application-submitted job tickets. In an embodiment of the invention, the filter-specific job tickets are submitted by the print manager 200 to appropriate ones of the filters 204.

The merged overlapping options will be a super set of the options defined by the separate filters for the feature having overlapping options. In an embodiment of the invention, the print manager 200 merges the duplicated features based on priorities assigned to the filters with which the features are associated. Furthermore, the priorities of filters are retrieved, by way of example, from a number of sources including: first, by priority assigned by a printer device for device-specific filters, and second by priority assigned by an administrator for non-device specific filters. The print manager 200 does not attempt to resolve, by itself, overlap and duplication in non-standard features (e.g., not present in the print schema).

As those skilled in the art will readily appreciate in view of the disclosure contained herein, there are many alternative ways to handle the overlapping features. For example, in an embodiment of the invention, a mechanism is included enabling two filters to negotiate priority when resolving overlapping/duplicated features. In accordance with yet another embodiment of the invention, duplicated features are presented to the application 202 for purposes of enabling a user to select which filter will provide a duplicated feature.

Furthermore, the print manager 200 supports refreshing the integrated data tree 212 to update the availability of the features supported by the included filters. This is necessary when users install/remove installable options, filters are added/removed, or availability of particular features is impaired because intervention is required by the print system. For installable options, where bidirectional communication ("bi-di") is available (e.g., the print manager is capable of obtaining information from a device through pushed as well as pulled updates), the print manager 200 obtains a current configuration and updates the feature properties in the integrated data tree 212. In the case where bi-di is not available, a user interface is required to get user intervention.

In an embodiment of the invention, when one of the set of filters 204 are added, upgraded or removed, the print manager 200 is notified that the availability of a feature has changed or features have been added/deleted. Thereafter, the print feature information maintained in the data tree 212 (described further herein below) is refreshed. In embodiments of the invention, any applications relying upon the content of the data tree 212 are notified that the content of the tree 212 has changed. One way to ensure that applications are aware of changes is to support an automatic notification function wherein an application registers for notifications with the print device.

The features data file parser and semantic handler 214 includes a semantic handler functionality 220 that facilitates resolving/avoiding feature conflicts between filters. The constraints established by the semantic handler functionality 220 are stored within the data tree 212. Thereafter, the constraints are enforced during the subsequent operation of the print manager 200 (e.g., when the filter is incorporated into a specific filter path).

In an embodiment of the invention, the semantic handler functionality 220 (also referred to as a constraints handler) processes constraints represented in the form of invalid combinations and positive associations of features. Invalid combinations describe a combination of options that cannot be selected together. For example, duplex printing (i.e., front and backside printing) is not allowed in combination with transparencies. Positive associations enforce selection of one or more related features based on a selection of a particular feature. Positive associations are similar to generic printer configuration macros and affirmatively prevent selection of invalid combinations of printer features. The semantic handler functionality 220 resolves the constraints so that currently selected combinations are always valid. The print manager 200 provides a standard interface to enumerate constraints. Applications access constraint information through the submission of requests in the form of output Property/Property|Data pairs or lists of pairs that are constrained with an input Property/Property|Data pair. Potential uses of the constraint information by applications include: an application limiting its print features display to valid combinations of features/options, and an application preventing a user from selecting invalid combinations of features/options.

The print manager 200 incorporates constraints from multiple sources in a variety of ways. For example in an embodiment of the invention, constraints are specified in a data file (GPD/PPD/GDL) submitted by any one of a number of possible sources including, for example, a filter (e.g., rendering filter (traditional driver), pre-processing filter (before rendering), and post-processing filters (after rendering)) or even an application. In an embodiment of the present invention, a new file, referred to as a filter description file ("FDF") provides filter information according to a defined XML schema. The filter information is provided to the print manager 200 via the parser interface 218 when a filter is installed. Alternatively, print manager 200 extracts the constraints from filters via a filter-print manager interface 222 exposed by each filter of the set of filters 204. In an embodiment of the invention, calls from the print manager 200 to the interface provided by the set of filters 204 are COM calls.

In an embodiment of the invention, the filters represented in the integrated data tree 212 register the constraints for their features to the print manager 200 through a GPD/PPD/GDL data file. Any time a feature descriptor is changed (a change in the integrated set of features presented by registered filters), the print manager 200 is notified. In response, the print manager 200 requests the new path to re-register constraints. In an embodiment of the invention, all constraint information for a feature descriptor is grouped with device configuration constraints. In an embodiment of the invention, a device configuration container maintains property/value data for a physical device's current configuration state. An exemplary configuration state entry is: Property: DuplexUnit and value:installed. Enumeration and resolution of constraints by the print manager 200 are based on this combined information.

The print manager 200 implements one or more of the following exemplary constraint resolution schemes. In an embodiment of the invention, the print manager 200 resolves constraints based on priority of the features and the priority of the filter. In particular, the policy for resolving constraints within a feature descriptor is as follows. First intra-filter constraints are resolved based on the priority defined for the features within the filters. In an embodiment of the invention, the scope of the intra-filter priorities is limited to a filter within which the feature is specified. Second the inter-filter constraints are resolved. In the case where a filter expresses inter-filter constraints (constraints between its features and some other features belonging to other filters), the filter expresses the relative priority of the constrained features in relation to features specified by other filters. Where there are conflicting priorities between filter features (e.g., both filters assert priority with regard to a particular feature), the relative priority of the filter itself in relation to the conflicting filter is considered when resolving the conflicting feature constraints. Such relative filter priorities are established, by way of example, from two sources: priority assigned by a device for device-specific filters, and priority assigned by an administrator for non-device specific filters. Other filter priority designation methods will be contemplated by those skilled in the art in view of the teachings contained herein.

Another element of constraint resolution is its timing. In an embodiment of the invention, constraints are resolved when a print job is submitted for execution by the print system or when a user interface is displayed based on a job setting. A failure to resolve constraints in response to the above-identified events introduces the opportunity for print errors, job rejection, and/or inaccurate user interface presentation—all of which are avoidable in view of the integrated print architecture presented herein.

Furthermore, in an embodiment of the invention, the print manager 200 facilitates constraint checking at a job ticket (specific print job description) level. By way of example, for any job ticket feature property "set" call by a user/application, the caller specifies constraint checking and how to proceed in the case of conflicting constraints. In such case, the print manager 200 intercepts calls to a job ticket, and if constraint checking is requested and a constraint exists, then the print manager 200 rejects the settings, reports the constraints and/or resolves the constraints.

A job ticket structure describes the manner a page, document, or job is to be processed, imaged, and finished by a set of filters associated with a feature descriptor (maintained by the data tree 212) for a particular print device/personality. The structure of the job ticket can take on any of a variety of forms in accordance with embodiments of the invention. In the illustrative embodiment, a job ticket manager 224, through a job ticket interface 226, provides support for a set of job ticket related operations. Such operations include, by way of example and not limitation, creating a default job ticket for a particular feature descriptor (a device default job ticket), creating a task-based job ticket for a user (user default job ticket), setting and getting job ticket properties, and validating a job ticket at print time and/or at the time of presenting features through a user interface.

The job ticket is represented, by way of example, in the form of a tree of XML ("extensible markup language") properties interpreted according to a job ticket schema. Each property in the tree includes one or more settings pertaining to a job, a document, a page, or range of pages (a range ticket). A corresponding job ticket schema provides the semantics and syntax for interpreting/processing the XML elements that make up the job ticket. In an embodiment of the invention, a job ticket is a pruned version of a feature property tree (non-selected features/options are removed). See FIGS. 5a and 5b below. The currently selected print feature values (e.g., portrait for the orientation feature) are designated for the feature properties. In some cases, removing the non-selected feature property nodes from the feature property tree implicitly designates the selected value. In other cases, such as a multi-select option (e.g., number of copies, n-up) where a list of potential selected options are presented, the selected current value must be explicitly designated in a current value placeholder.

Furthermore, the information in the pruned tree structure of the job ticket is not limited to currently selected feature options. In an embodiment of the invention, the job ticket includes supplemental information describing non-standard print schema extensions to enhance the robustness of job ticket processing. As those skilled in the art will readily appreciate, such a job ticket can be carried out in many ways.

At device creation time, the print manager 200 creates one or more default job tickets (one for every feature descriptor—corresponding to a particular printer/personality combination). The default job tickets are based on the default settings provided by ones of the set of filters 204 designated by the feature descriptor during the printer device installation process. After identifying a feature descriptor, the print manager 200 calls each of the filters identified within the feature descriptor to obtain features and defaults via, by way of example, GPD/PPD/GDL files. From the information obtained for a particular feature descriptor, the print manager 200 constructs a default job ticket. In the illustrative embodiment of the invention, most of the information associated with a default job ticket is described in the print schema. Any other information needed to describe an extension of the print schema is included in the job ticket.

Another aspect of the job ticket is the creation of certain task-based print job ticket templates. The templates are stored, for example, at the system level (e.g., part of user profiles). A user default job ticket template supported by the job ticket manager 224 facilitates designating a device independent task-based print job ticket template. The user default job ticket exposes different features according to the particular requirements of the print task. In embodiments of the invention the print manager 200 supports merging of a user default job ticket template with a device default job ticket.

Validating a job ticket, prior to submitting the job ticket for execution, avoids print errors. In an embodiment of the invention, validation is performed when the print job ticket is accessed by a user interface and at print time. By way of example, validation is carried out in two forms. A first form involves resolving constraints specified within filters. A second form involves making necessary changes to job tickets to ensure that all job ticket values are valid and fall within the functionality supported by the filters in the feature descriptor. Given a job ticket, the print manager 200 validates the settings based on the capabilities reported by the print device and designated filters. For example, a job is submitted with a feature/option not supported by the current print device. Depending on validation flags specified by the caller (e.g., make any changes necessary to make the settings valid or fail if the exact settings cannot be printed), the print manager 200 issues a "fail" for the validation call or changes the settings to a value supported by the current device (e.g., invalid or out of range values are given default values).

Continuing with the capabilities/functions of the print manager 200 with regard to the job ticket, the job ticket manager 224 and job ticket interface 226 enable an application to submit get/set calls to retrieve and modify the contents of a job ticket via standard XML/document object model (DOM) or Simple API for XML (SAX) interfaces for accessing and writing XML elements. All data stored in a job ticket container is capable of persisting beyond a user/application session (e.g., stored according to XML/DOM).

In an embodiment of the invention, the print manager 200 is not responsible for presenting a user interface. Instead, a user interface manager 230 and associated UI interface 232 provide data for a known Common Property Sheet (CPS)UI/PrintUI component 234 that fulfills this function for the application 202. The CPSUI is a generic user interface handler for printer drivers, and it takes care of user interface controls and building property sheet/tree views. The "PrintUI" comprises the print system components that handle printing-related user interfaces (e.g., print folder, common print dialog, etc.).

The print manager 200 is the integration layer for user interface data received from one or more of the filters 204. In view of this additional integration functionality supported by the print manager 200, at least three potential modes are provided for presenting a user interface based upon the features supported by ones of the filters 204. First, the filter provides no direction with regard to either user interface presentation or processing. Instead, the print manager 200 uses provided GPD/PPD/GDL/FDF data files and presents a user interface and processes user interface requests based on the data provided by the filter and predefined system default behavior. Second, at the other side of the spectrum, a filter completely specifies its user interfaces. Third, the filter and print manager 200 cooperatively present the user interface. The filter supplies a portion of the user interface and the user interface manager 230 constructs the rest of the user interface based upon information in the provided GPD/PPD/GDL data files. Functionality provided by the GDL files allow an independent hardware vendor (IHV) to indicate which features need assistance by the print manager 200 when presenting a user interface. On the application side, the print manager 200 negotiates, via the user interface manager 230, with the application 202 when determining the content of the user interface.

A filter manager 240, providing a filter execution interface 242, communicates with the filter director 206 to manage/control execution of a print job by the set of filters 204 according to a print job ticket. This is accomplished by identifying a filter path and features completed on a submitted print job by filters in the specified filter path. During execution of a print job, the filter director 206 routes each page of the print job through the pipeline of specified ones of the set of filters 204 in accordance with a job ticket describing how the print job is to be completed. In an embodiment of the present invention, the filter manager 240 maintains a container for installed filters. Filters are, by way of example, treated as dynamically linked libraries and merely need to be "installed" to create an awareness by the print manager 200 of their existence.

An XML schema associated with the filter manager 240 facilitates establishment of setup and user interface agents to communicate with the print manager 200 about filters and feature descriptor installation, enumeration and deletion. The print manager 200 uses this information to build filter objects and feature descriptors that are available to each installed device. Other agents in the print system utilize the filter manager XML schema to retrieve filter and feature descriptor information.

The filters 204 are agents that complete particular portions of a print job. The filters 204 include, by way of example, one or more filters capable of: transforming a job from one data format to another (e.g., EMF to PDL), modifying the data to perform a transformation, transferring data from one location to another, or evaluating the content of the job and setting instructions in the job ticket for further processing by another filter.

The following are exemplary characteristics of the filters 204. The filters 204 can possess their own user interface. Thus, filters can provide a user interface that is independent of other ones of the filters 204 and the print manager 200. For example, a particular filter includes its own property sheets for the system user interface. Another characteristic of the filters 204 is that they are capable of possessing a set of features that are defined and published to the application 200.

A filter can, for example report its features via a GDL (generic description language) file and have the reported features integrated with the rest of the print system features when represented to the applications. Yet another characteristic supported by the filter architecture is reporting a set of constraint information that is integrated by the print manager 200 with other system constraints identified by the semantic handler 220.

Furthermore, filters possess the characteristic of well-defined input and output data types. A filter's output and input data can be the same type. It is also not necessary for a filter to manipulate the input data. Instead, some filters merely evaluate the content or write something into a job ticket associated with a particular print job. Some filters are pass-through filters that do nothing other than pass the received print data through from input to output. A pass-through filter is utilized in the present print architecture for scenarios where the application 202 has generated printer ready output, and the only remaining task is to send the print job through the required filter stage for presentation to a printer interface.

In an embodiment of the invention, the filters possess the characteristic of communicating features, constraints, and installation information to the print manager 200 via a GDL file. Failure to perform this communication step potentially leads to a failure to install and integrate the particular filter with the rest of the filters 204 in the print system.

The filters are generally classified into three types based upon their typical positions in filter paths: inbound, rendering, and outbound filters. Inbound filters are pre-rendering filters. The output of an inbound filter is in the same format as the input data format (e.g. EMF->EMF). In an embodiment of the invention, particular inbound filters are capable of evaluating a received job and setting appropriate properties/instructions for later processing. In making such modifications, the inbound filters are potentially capable of modifying the subsequent processing of the print job by downstream filters. For example, a job pre-analysis filter evaluates the content of the print job and saves information for optimal rendering at a later time. Another example of an inbound filter is a billing filter that brings up a user interface prompting a user for an account number or other suitable authorization/verification information before proceeding with the print job.

Rendering filters perform print data format conversion functions generally equivalent to printer drivers in the prior known print architectures. Rendering filters take input data in a first (e.g., high level, printer independent) format and render output in a second (e.g., printer personality-specific) data format. For example, a PDL rendering filter takes a spool format such as EMF and converts it to a PDL-specific data stream.

Outbound filters perform post-rendering processing functions. Outbound filter output data is generally in the same format as the outbound filter input format. Outbound filters generally manipulate the raw printer-ready data output rendered by a rendering filter. By way of example, a PostScript color processing filter manipulates PostScript print data to render output print data in the same (i.e., PostScript) format.

Yet another aspect of the filters 204 is their capability of being chained together in a filter pipeline/path and executing, on a page by page basis, a print job by passing the pages of the print job through the pipeline of designated ones of the filters 204. The filters of a particular filter path are referenced by filter name or any other suitable alternative such as GUIDs. Priority information is provided for the filters of a filter path (for purposes of resolving duplication and overlap). Execution order information is provided for each filter in the path. The information pertaining to a filter path is extensible, thereby allowing the addition of supplementary information describing a filter path in a feature descriptor. This extensibility facilitates independent software vendors creating device-independent value-added filters that are installable within the print system depicted in FIG. 2. Examples of such value-added filters are an accounting filter that monitors and bills for print jobs and a security filter that facilitates restricted access to particular devices (e.g., limits access to a color printer). A rendering filter is not an essential stage in all filter paths (e.g., a pass through filter pipeline/path arrangement for cases where applications provide print ready data).

The ability to designate a chained pipeline of filters provides extensibility to the functions supported by the print system. Adding another filter to the previously existing chain of filters augments a previous print system. Such extensibility is likely to be exploited in the area of print management. Such extensions enable administrators to build custom print management solutions based on multiple filters. For example, an administrator can add an accounting filter to augment printing to one or more printers in a network.

Filter pipelining describes a mode of processing print jobs wherein a stream of print jobs passes through a set of designated ones of the filters 204 in a filter pipeline/path. In an embodiment of the invention, print jobs are specified on a page-by-page basis. Thus, in a filter pipeline arrangement different filters can process different parts (e.g., pages) of a print job at different filter stages at any given time. However, in an embodiment of the invention, there is no parallel processing of a same part (e.g., page) of the print job by different filters at any one time. Furthermore, as suggested above, an exemplary boundary for the job pipelining is at the page boundary. Therefore, one filter completes a page of a job before the next filter in the pipeline commences processing the same page.

Figures 3, 4:
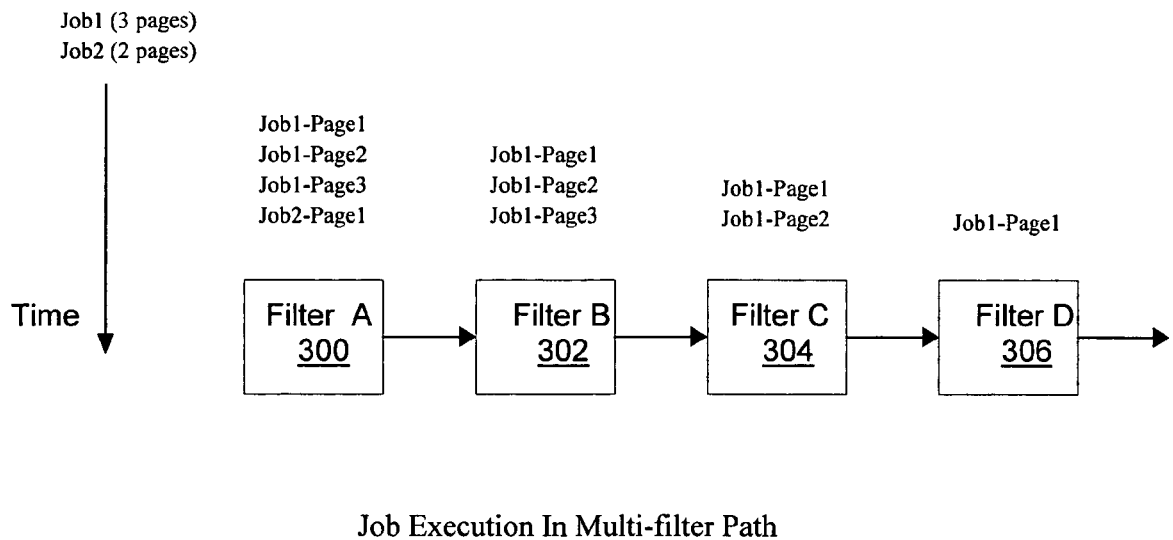
FIG. 3 is a schematic diagram illustratively depicting the processing of multiple jobs comprising multiple pages by a filter pipeline/path in accordance with an embodiment of the present invention.
FIG. 4 summarizes a set of components of a feature descriptor describing the capabilities/limitations/default behavior associated with a particular print device personality.

Turning briefly to FIG. 3, a diagram illustrates partial processing of print job 1 and print job 2 by a filter pipeline comprising filters 300, 302, 304 and 306. When a filter completes processing a page, the page is passed to a next filter in the pipeline. Thus, at any given time, the pages processed for a print job can differ among the set of filters in the pipeline/path. It is noted that while print job 1 and print job 2 specify a same filter path through filters 300, 302, 304 and 306, the printer architecture of the present invention supports a device print queue that is independent of the specified filter path for print jobs directed to a particular print device. Thus, in an embodiment of the present invention, a single print queue orders pending print jobs to a single, multiple personality print device, characterized by multiple feature descriptors defining differing filter paths. In an embodiment of the present invention, a job scheduler determines the manner of completing the processing of pending print jobs based upon a number of factors including: size of job, time of submission, priority of user, etc. Thus, a single print job can pass multiple times through a queue before completion (e.g., one filter is applied per pass) to prevent delays for other pending print jobs within a same queue. Alternatively, all print jobs are completed in a single pass through the queue.

Having described filter pipelines/paths, attention is directed briefly to the aforementioned feature descriptor (container) data structure maintained by the print manager 200 that defines the execution path of jobs through particular ones of the filters 204. In an embodiment of the invention, the feature descriptor is implemented as a tree container structure. However, alternative data structures are contemplated in alternative embodiments of the invention. Turning briefly to FIG. 4, the feature descriptor includes a name 400 that preferably summarizes or generally conveys the functionality supported by the filters designated in the filter path associated with the feature descriptor. For example, the name "PostScript Printing" implies the associated filter path includes a PostScript rendering filter. The feature descriptor name is created, for example, by an administrator from a system menu or provided by the device during installation. A filter path 402 identifies the names of filters and their order for processing the pages of a print job.

A feature property tree 404 contains a hierarchical arrangement of properties and values describing the aggregated set of features/capabilities of the filters in the filter path 402. Property nodes in the feature property tree 404 have at least one child (a value or property), and can contain multiple children (values or properties). The leaves of the feature property tree 404 contain values—a single piece, or homogenous list, of data. Examples of values include user-selectable values (enumerated or a range) for the associated property (the value node's parent). For example, a "copies" property includes a value specifying a range from 1 to 99 copies. A stapling location property has a list value identifying the potential locations for placing a staple. Other values comprise text string names corresponding to a property. Thus, in general the leaves of the feature property tree 404 are placeholders for storing one or more selectable values for a particular property.

The feature descriptor includes a set of constraints 406. The set of constraints 406 is a composite of all the constraints associated with the filters identified in the filter path 402. The set of constraints 406 are utilized during the configuration of a job to ensure compatibility between selected values for feature properties.

A default job ticket 408, previously discussed above in association with the job ticket manager 224, is created from the default values of the features in the feature property tree 404. In an embodiment of the invention, the filters that make up the filter path 402 provide the default values. The filters, for example, provide such values during installation of the feature descriptor.

In an embodiment of the invention, feature descriptors, from an end-user's perspective, are static. The application 202 cannot modify the feature descriptors. Instead, through the application, a user changes from one feature descriptor to another, but cannot change the order, or the presence, of any filters in the designated filter path for a feature descriptor.

However, in an embodiment of the invention, feature descriptor editor tools/templates enable an administrator to modify/create feature descriptors from a system menu. Feature descriptors are updated by an administrator to incorporate new functionality provided by new filters or updated versions of previously installed filters. The filter path 402 is updated to reflect a new chain of filters arising from the updated filter set. The feature property tree 404 is updated to reflect changes in the set of features provided by the filters identified in the updated filter path. Constraints 406 are re-evaluated and may require updating in view of new relations created by the changes to the filter path 402. Furthermore, the default job ticket 408 is updated to reflect the changes to the features/options designated for the default job and/or pages within the job.

Feature descriptors enable print jobs pertaining to differing personalities of a same print device to be placed in a single print queue for the device. The print job designates a particular feature descriptor corresponding to a printer personality to which the print job is directed. For example, a multiple personality printer device (PostScript and PCL) includes two feature descriptors—one for PostScript and the other for PCL. For any particular print job, only one feature descriptor is active. At start-up, an application queries for device capabilities on a currently active feature descriptor (e.g., PCL). The user of the application composes a document and performs a File/Print. At this time, the application and print system described herein enables the user to change the active feature descriptor to designate, for example, the PostScript feature descriptor. This is analogous to changing a printer at print time, but instead involves selecting a printer personality of potentially many personalities supported by a single print device.

The print system architecture disclosed herein supports alternative ways of implementing a multi-personality print queue. In one alternative, a single active feature descriptor designates all the filters utilized by the set of multi-personalities. For each job, a corresponding job ticket identifies which ones of the set of designated filters are active (perform a function) or passive (merely pass the job through). Re-ordering of the filters is supported by including multiple instances of the filters at different locations within the filter pipeline. Another way to implement multiple personalities is to incorporate the multiple personalities into particular distinguishing (e.g., rendering) filters. In that case, the job ticket designates one of the supported personalities through a selected feature property that thereafter drives internal switches/cases within the multi-personality filter(s).

The filters are not limited to print functionality, as mentioned hereinabove, the print manager architecture supports an extensible set of functions through the addition of filters. A further example of such extended functionality is a routing filter that submits files/data to a routing device.

Figure 5A:
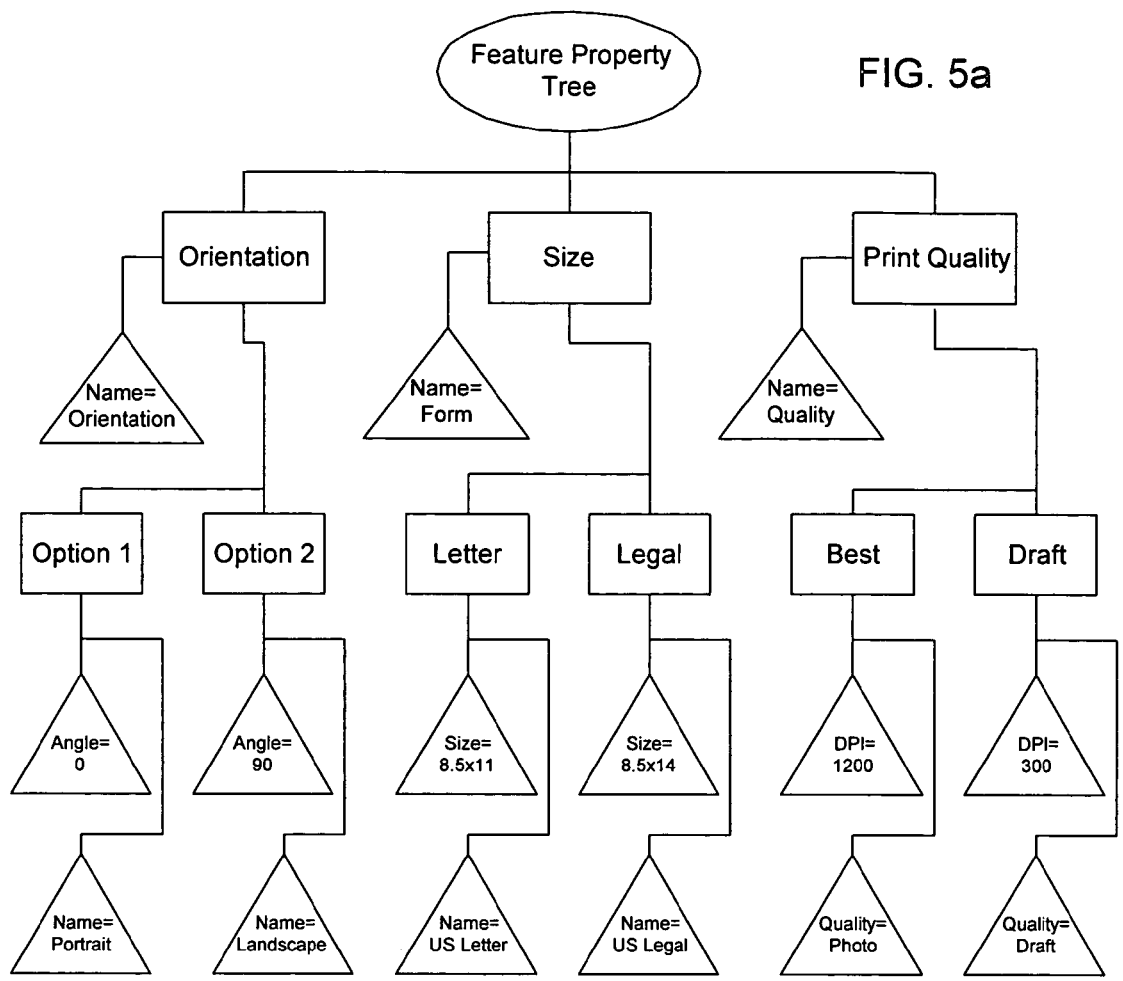
FIG. 5a depicts the contents of an exemplary feature property tree in a feature descriptor.
Figure 5B:
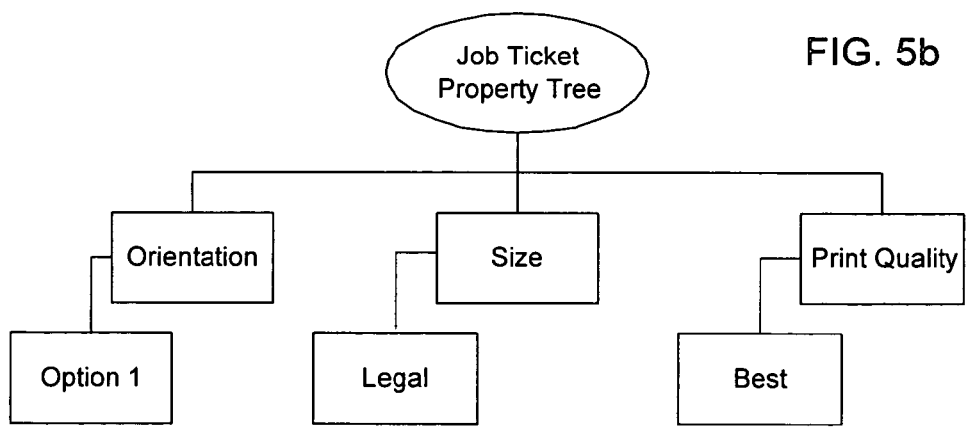
FIG. 5b depicts exemplary contents of a ticket describing the selected property values to be applied to a print job.

With reference to FIGS. 5a and 5b, an exemplary property tree structure and a derived job ticket structure are provided. In the feature property tree depicted in FIG. 5a, the rectangles specify properties and triangles specify data for the properties. The highest level specifies general properties (e.g., page orientation, paper size, print quality). Lower levels identify specific properties. The leaves of the property tree specify the values assigned to (or range of assignable values for) the properties.

Turning to FIG. 5b, the depicted job ticket is a reduced version of the property tree of FIG. 5a. At the highest level, each property remains (e.g., orientation, paper size, and print quality). However, non-specified options are pruned from the original property tree. In the case where a range of values are provided, the specified value in the range is stored as a current value. Pages inherit settings from the job settings, and while not depicted in FIG. 5b, the page ticket potentially contains a feature setting value differing from the job ticket settings. In that case, the page feature setting value overrides the default job feature settings. The hierarchical inheritance/overriding behaviors of property settings are described herein below with reference FIGS. 15-20 that illustratively depict an exemplary framework and method for processing multilevel, hierarchically specified job tickets.

Though not depicted in FIG. 5b, the job ticket has job and page ticket feature completion information. In the case of overlapping or duplicated feature completion capabilities by filters in a filter path, a filter will not perform a feature already marked as completed in the job ticket. Thus, when a filter completes a feature, the corresponding feature completion entry is set to prevent further processing of the complete feature by another filter.

Attention is now directed to execution of print jobs (described by job tickets) by the above-described exemplary print system embodying the present invention. Print job processing comprises execution of the tasks enumerated in a job ticket by one or more filters in a filter path identified within a designated feature descriptor. Turning to FIG. 6, in an embodiment of the present invention, such print job processing comprises one or more of the following functions (though not necessarily all of the functions or in a particular order). Many of the functions were previously described herein.

A filter ordering function 600 is carried out to establish an order for submitting a job request to filters in a filter path designated within a selected feature descriptor. The filter ordering function 600 is carried out in a number of potential ways. For example, filter order is determined at the time of creating a corresponding feature descriptor by an administrator. Alternatively, filter order is determined at the time of device installation. In this latter exemplary method for determining filter execution order, the print manager 200 reads a setup (e.g., GDL) file to obtain device-specific instructions regarding the identities and sequential ordering of filters in a filter path. Other methods for ordering the filters, including ones carried out by the print manager 200 based upon an established criterion, are contemplated in alternative embodiments of the invention.

A pass-through function 610 is performed in the case where the application 200 supplies a job having print-ready data. In this case, the filter does nothing to the submitted print data other than passing it to a print interface for submission to the designated print device.

A pre-flight function 620 submits a job ticket through a filter path (determined during stage 600). Pre-flighting enables the filters within the filter path to validate the job ticket prior to executing the more computationally intensive rendering of output job data. A failure to validate prior to printing might cause the print device to go into an otherwise avoidable error state. During execution of the pre-flight function 620, the job ticket is pre-flighted through an established filter path with specific notification to the individual filters that it's a non-execution pass. The notification, by way of example is in a form of a standard property in the print schema and specified in the job ticket. In view of this notification, the filters are able to by-pass operations that are not relevant to the pre-flight validation procedure.

A priority resolution function 630 resolves which one, of multiple filters providing either duplicated/overlapping features, will process a duplicated/overlapping feature first. Referring to the priority resolution function 630, the print manager 200 resolves overlapping and/or duplicated features arising from different filters specified in a feature descriptor's filter path. The priority resolution function 630 is policy driven. In an embodiment of the present invention, the print system default policy favors device-supported features over software-simulated features. For example, a feature of outputting multiple copies of a document can be carried out by the device (printer) hardware or by submitting the page multiple times to the device. Applying the above policy, the print system by default favors the hardware device's implementation. Similarly, features reported by a rendering filter are generally a device's implementation of the features. Thus, the rendering filter has first priority with regard to completing overlapping or duplicated features.

There are a number of ways (in various embodiments) in which the print manager 200 manipulates a print job ticket to ensure that a duplicated feature is handled by a later, higher priority, filter in a filter pipeline. One such way is to manipulate the filter-specific job ticket submitted to each filter in the filter pipeline. In one embodiment, the print manager 200 marks the print job ticket to indicate that no action is needed by the receiving filter (e.g., reserved or completed designation) for a particular feature that is to be executed by a subsequent filter. Alternatively, the print manager prevents a lower priority filter from executing a feature by removing the feature from the print job ticket supplied to the lower priority filter. In the event that a job must pass through a lower priority (e.g., software-supplied) filter having a duplicated/overlapping feature with a subsequently executed higher priority filter, the duplicated feature is marked by the print manager as reserved or completed, or removed prior to routing the job ticket through the lower priority filter. This supplemental pre/post processing is necessitated by the need to accommodate both implicit priority (with regard to overlapping/duplicated features) and the order of filters as they appear in a pipeline/path associated with a selected feature descriptor for a job. This manner of executing a job ticket includes intermediate handling of a print job as the print job passes through the filter pipeline. In yet other embodiments of the invention, the print job ticket explicitly designates a filter that is responsible for executing each feature. A filter only executes a feature if it is identified. This particular embodiment requires the filters to have an awareness of a designated executing filter field in a job ticket. However, it also avoids the need to submit filter-specific job tickets to the filters in a pipeline (thereby reducing processing of the job ticket itself).

A feature completion status communication function 640 enables notification of down steam filters in a pipeline when a feature is completed to prevent subsequent processing of the completed feature.

Having described the general architecture and operation of a print system embodying the present invention, attention is directed to interfaces identified in FIG. 2 that facilitate interaction between the print system components (e.g., print manager 200, filters 204, application 202, etc.). In an embodiment of the present invention, such interfaces are implemented as a combination of XML schema and COM interfaces or .NET interfaces. In cases where a COM interface or .NET interface is described, it is noted that in alternative embodiments of the invention the interface is implemented through XML schema (and vice versa).

In an embodiment of the invention, schema associated with the filter manager 240 enable setup and user interface agents to communicate information to the print manager 200 with regard to filters and feature descriptor installation, enumeration and deletion. The print manager 200 uses this information to build filters and feature descriptors. The filters and feature descriptor are then made available to installed devices. Other agents in the print system use the filter manager related schema to obtain filter and feature descriptor information.

In an embodiment, the filters 204 provide identifying information that facilitates filter initialization in the print system in the event of installation self-initialization and/or upgrade. Such information, provided for example by a setup agent for a filter to the print manager 200 at the time of installing the filter, includes: a filter name, manufacturer (the name of the company writing the filter), files (a list of files associated with the filter), version, environment (e.g., x86, IA64), and filter GUID. The information is utilized by the print manager 200 to build a filter sub-container within a filters container maintained by the print manager in the integrated data tree 212.

A feature descriptor schema, summarized in FIG. 7, represents a feature descriptor. In an embodiment of the invention, the feature descriptor schema includes the following tagged properties: a name 700 (e.g., PCL, PostScript), a description 702 (e.g., Prints Postscript), filters 704 (e.g., a list of filters identified, for example by an array of GUIDs), status 706 (the status of the feature descriptor taken for example from the choices of: Installed, Not Installed, Pending Deletion, and Pending Update), and action needed 708 (e.g., install, delete, update, and none). With regard to the status 706, when a caller requests the status 706 value it will always be "installed." The remaining statuses are used by the print manager to perform clean up or initialization of incomplete feature descriptors that reside in a pending feature descriptor container in the print manager 200's data tree 212. A feature descriptor is transferred from the pending feature descriptor container to the (fully installed) feature descriptor container once initialization is completed.

Having described an exemplary embodiment of the schema for a feature descriptor, a set of operations (install, enumerate, update, and delete) performed in association with the feature descriptor schema are described. A client (e.g., a setup or user interface agent) commences installing a feature descriptor by creating a new feature descriptor property tree including the information described above for the feature descriptor schema. The client sets the feature descriptor status 706 to "Not Installed" and the action needed 708 to "Install." The print manager 200 places the new feature descriptor property tree in a pending feature descriptors container maintained by the print manager 200.

Thereafter, the print manager 200 processes the pending feature descriptor by initially validating the feature descriptor to ensure that all filters specified in the designated filter path are installed. The print manager 200 calls each filter in the filter path to register a GDL for parsing (features/constraints) by the syntax parser 218. The print manager 200 thereafter creates an integrated feature property tree 404 from the data reported by the called filters, and the feature property tree 404 is placed within the feature descriptor container in the pending feature descriptors container.

After creating the integrated feature property tree, installable option information is obtained from a configuration property tree owned by the print system. In an embodiment of the invention, the configuration property tree is maintained by a device configuration manager (not shown) that operates in parallel with the print manager 200. The installable option information is used to update the feature property tree in the feature descriptor container to reflect a current configuration. Next, the print manager 200 creates the default job ticket 408 for the Feature Descriptor from the Feature Property tree. Upon completing the installation of the new feature descriptor, the print manager 200 changes the status 706 for the feature descriptor to "Installed" and the action needed 708 to "None." The fully installed feature descriptor is moved from the pending feature descriptor container to the feature descriptor container for the device.

A print manager 200 supports a delete action on a currently installed feature descriptor. Initially, a client (UI agent) sets the action needed 708 on a particular installed feature descriptor to "Delete." Thereafter, the print manager 200 checks filter reference counters to the feature descriptor (ensure that no clients are currently using the feature descriptor). The print manager 200 transfers the new feature descriptor property tree to the pending feature descriptors container maintained by the print manager 200. All filters referenced in the filter path 402 are instructed to perform cleanup (remove references to the deleted feature descriptor). The status 706 of the feature descriptor is changed to "Pending Deletion." The container for the deleted feature descriptor (see FIG. 4) and its associated components are removed from the print manager 200's pending feature descriptors container.

The print manager 200 can list the installed feature descriptors installed on a print system and provide access to the properties/values of each. In an embodiment of the invention, a client can enumerate on the print manager 200's installed feature descriptor containers directly. The caller receives a listing of installed feature descriptors on a device. To obtain additional information regarding a particular one of the enumerated feature descriptors, the client opens up the particular feature descriptor's container and accesses the corresponding feature property tree 404, default job ticket 408, and other feature descriptor information summarized in FIG. 4.

The print manager 200 supports updating a previously added feature descriptor. A client initiates updating a feature descriptor by setting the action needed 708 property for a selected feature descriptor to "update." Thereafter, the print manager 200 receives notification to process specified changes to the selected feature descriptor. The processing includes initially moving the selected feature descriptor container back to the container for pending feature descriptors, and setting the status 706 property to "Pending Update." The printer manager 200 validates the feature descriptor to ensure that the filters specified in the filter path 402 have been installed. Thereafter, the print manager 200 calls each of the filters specified in the filter path to provide their GDL information for parsing and constraint handling by the syntax parser and semantic handler 214. From the processed GDL files of the filters, the print manager 200 creates an integrated feature property tree 404 for the updated feature descriptor container. The print manager 200 obtains installable option information regarding a physical device's current configuration (e.g., duplex unit: installed, installed memory: 4 M, etc.) from the configuration property tree and updates the feature property tree 404 accordingly. The print manager 200 modifies the previous job ticket to the extent needed in view of a default job ticket associated with the updated feature descriptor. The status 706 property of the feature descriptor is set to "Installed" and the action needed 708 property is set to "None." The fully updated feature descriptor is then moved from the pending feature descriptors container to a location reserved for a device's installed feature descriptor containers.

FIG. 8 depicts a set of properties within an exemplary filter execution schema. The filter director 206 utilizes the tagged properties of the filter execution schema, stored in a job container for a print device, to route a job through a designated filter path. A job status 800 property specifies the status of a print job. Potential values include None, Start, Processing and Complete. A current filter name 802 property identifies the filter that is currently processing the print job. A current filter status 804 property identifies the completion status of the job with regard to the current status. In an embodiment of the invention, potential status designations include: none, processing, and completed.

Figure 9:
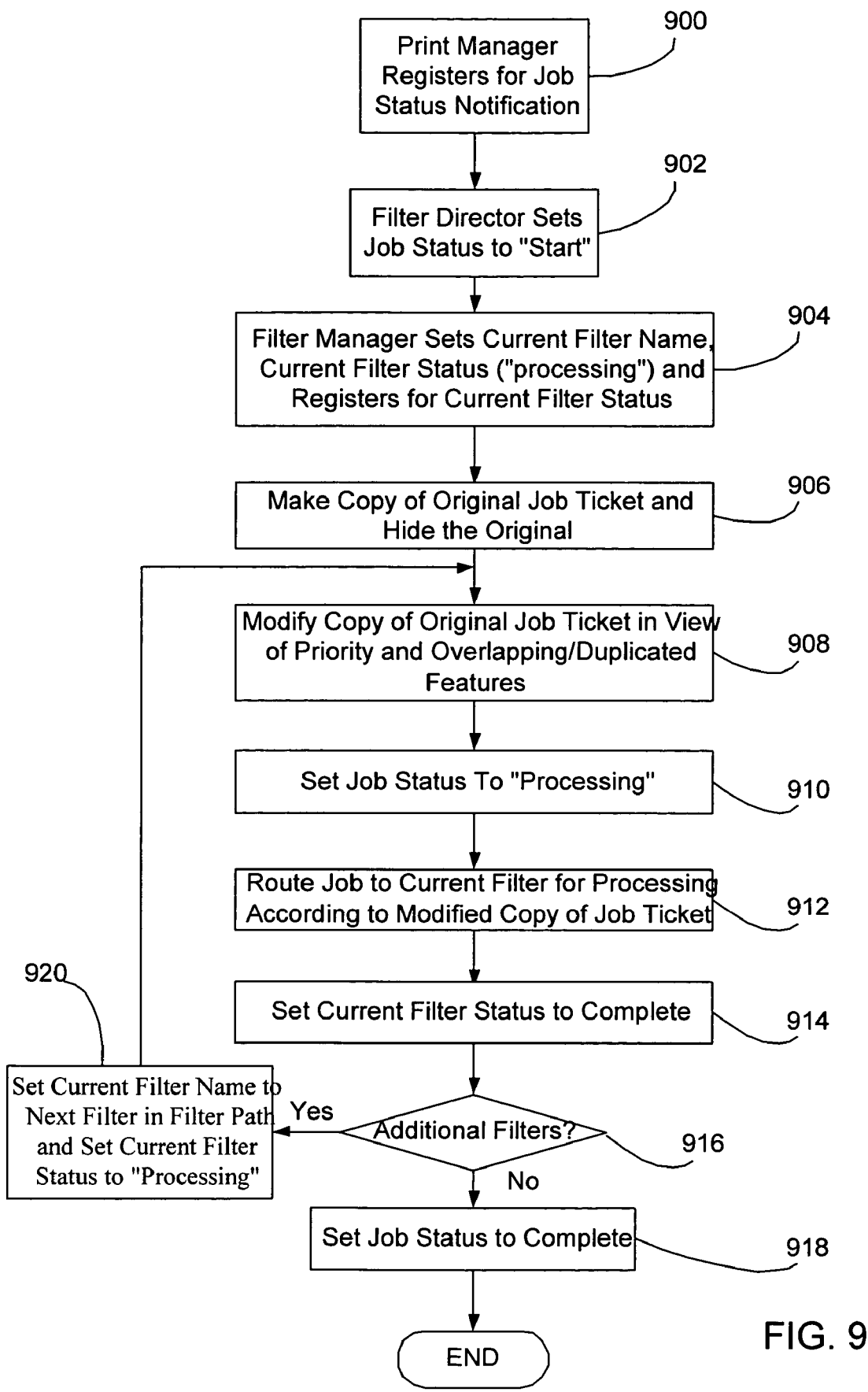
FIG. 9 is a flowchart summarizing a set of steps performed by the print system to execute a print job according to a ticket potentially specifying multiple filters.

Having described the filter execution schema, exemplary use of the filter execution schema to carry out a print job in accordance with a particular job ticket is described with reference to the steps depicted in FIG. 9. The job ticket is associated with a particular job to be processed from a print queue associated with a particular device. As explained above, in an embodiment of the present invention, the jobs are broken down into individual pages that are then submitted to filters along the designated filter path. The steps that follow describe the process flow of a job page through a filter path when a print job is invoked.

When executing a print job based on a job ticket, the operation of the print manager 200 and filter director 206 is governed by the job status 800 and current filter status 804. Their statuses are timely reported to the print manger 200 and filter director 206 in the form of notifications when their states change. During step 900, the print manager 200 registers for notification on the job status 800 property. When the print job is ready for processing, at step 902 the filter director 206 sets the job status 800 to "start." Upon notification of the "start" status, during step 904 the print manager 200 sets the current filter name 802 for the print job to the first filter in the designated filter path, sets the current filter status 804 to "processing" and registers for notification on the current filter status 804.

In an embodiment of the present invention, the print manager 200 modifies feature/completion information in a job ticket to prevent completion of features by particular filters. Rather than eliminate the original job ticket, during step 906 the print manager 200 copies the job ticket associated with the current job. Furthermore, the original job ticket is hidden so that the filter director and filters act upon the modifiable copy of the job ticket. Next, during step 908, the print manager 200 modifies the copy of the job ticket to accommodate priority and overlapping/duplicate features/options for the current filter. For example, the print manager 200 may temporarily mark an overlapping feature as complete to prevent an earlier device in a filter path from completing the feature, and thereby reserve completion of the feature for a subsequent filter. Furthermore during step 908, the print manager 200, at some point during filter pipeline processing, will "unmark" a previously reserved job ticket feature to enable a filter to process the previously reserved feature. Thereafter, during step 910, the print manager 200 sets the job status 800 to "Processing."

The filter director 206, also registered to receive job and current filter status notifications, is notified of the job status 800 change from "Start" to "Processing." In response, during step 912 the filter director 206 routes the job to the filter specified in the current filter name 802. Upon reception by the filter, the page is placed in a queue for the filter, where the page waits if the page cannot be processed right away. In an embodiment of the invention each filter preferably processes the pages of a job in a FIFO order. Note that in this embodiment, any filter in the path can, if desired, queue up the whole job before processing anything.

The filter accesses the job ticket and completes the incomplete features with which it is associated, and updates the job ticket accordingly. More particularly, when a job page is presented to a filter during step 912, the filter checks the job and page processing features corresponding to the particular filter in the corresponding job ticket. Thereafter, the filter executes all incomplete features that it is capable of completing on the page. Upon completing a feature for a particular page, a corresponding feature entry is marked as completed on a particular page ticket of the job ticket. By checking a completion status of a feature for a page before completing the feature, and marking the completion of the feature within the page ticket to prevent completion of a feature by another filter, the present print system ensures that filters having overlapping functionality will not complete a feature that is designated to be completed by another filter.

When the filter completes processing the page of a job, it signals the filter director 206 that it has completed processing the page. Thereafter, at step 914 the filter director 206 sets the current filter status 804 to "Complete."

Upon notification that the current filter status is complete, at step 916 the filter director 206 determines whether additional filters remain in the filter path designated by the filter descriptor. If none remain, then at step 918 the filter director 206 sets the job status 800 to "Complete." Upon notification that the job is complete, the print manager 200 releases its request for job status notification.

Otherwise, at step 916 if at least one additional filter exists in the filter path, then control passes to step 920. At step 920 the print manager 200 replaces the current filter name 802 by the name of the next filter listed in the filter path 402 and sets the current filter status 804 to "processing." Control thereafter returns to step 908 wherein the print manager 200 performs any further needed modifications.

Turning to FIG. 10, a set of exemplary methods/operations associated with the job ticket interface 226 are listed. The job ticket interface 226 supports job ticket related operations such as creating a default job ticket for each feature descriptor when a device is installed, setting and getting job ticket properties, resolving constraints, and performing general validation of a job ticket information. The job ticket interface 226 includes methods to create, delete, get, set, enumerate and validate job tickets. Operations relating to getting, setting and enumerating properties are schema driven. The set of methods for the job ticket interface are exemplary and are modified/supplemented in alternative embodiments of the invention. Furthermore, while set forth as a COM interface the methods of the job ticket interface are carried out, by way of example, using a job ticket XML schema.

A Create Job Ticket method 1000 creates a default job ticket for a given feature descriptor of a device. The interface receives a location of the feature descriptor from which a default job ticket is to be rendered as well as security attributes. A location for storing the resulting default job ticket is also specified.

A Delete Job Ticket method 1010 deletes an identified job ticket. This method facilitates cleaning up job tickets. The input identifies the path to the job ticket that is to be deleted.

An Open Job Ticket method 1020 opens a copy of the job ticket. This method is called, for example, by the print manager at the start of print job execution (described herein above with reference to FIG. 9). The passed parameters include the job ticket container from which a caller requests a copy. The Open Job Ticket method 1020 returns a pointer to the copy of the job ticket container.

A Set Property/Data operation 1030 is schema driven and enables setting of a particular identified property or value in a job ticket referenced by a submitted property tag. Similarly, a Get Property/Data operation 1040 enables retrieving a particular identified property or value in a job ticket. An Enumerate Property/Data operation 1050 enables retrieving a set of information under an identified property/data. A Create Property/Data operation 1060 creates a property or data for a job ticket. A Delete Property/Data operation 1070 deletes a property or data from a job ticket. Exemplary types of properties and data are described herein below with reference to a print schema.

A Validate Job Ticket method 1080 validates the job ticket. In the case where invalid settings are encountered, individual properties are modified so that the settings are valid for a current device and configuration. The caller passes a reference (e.g., pointer) to the job ticket container to be validated. If constraints are to be resolved, then the caller sets a ResolveConflict flag in the call to the job ticket interface 226.

The feature property interface 211, comprises a set of methods, summarized in FIG. 11, that, in conjunction with a print schema (described herein below), exposes feature information associated with a particular feature descriptor. The scope of the exposed information is a composite of all the features and their attributes supported by the filters in a referenced feature descriptor. A Get Feature Property Tree method 1100 opens a copy of the property tree for a particular feature descriptor. The caller passes a reference to the property tree, and a reference to the root of the feature property tree is returned.

A set of operations, supported by the feature property interface 211, provide access by applications and other print system components to access and modify the contents of an opened feature property tree. A Set Property/Data operation 1110 is schema driven and enables setting a particular identified property or value after "getting" the feature property tree. Similarly, a Get Property/Data operation 1120 enables retrieving a particular identified property or value in a feature property tree. An Enumerate Property/Data operation 1130 enables retrieving a set of information under an identified property/data. A Create Property/Data operation 1140 creates a property or data for a feature property tree. A Delete Property/Data operation 1150 deletes a property or data from a feature property tree.

The Parser interface 216 of the print manager 200, comprises a set of methods, summarized in FIG. 12, that, in conjunction with a print schema (described herein below), exposes filter capability/feature/configuration (e.g., GDL) file parsing functionality to the filters 204. By way of example, the filters 204 register functionality and constraints through a GDL file and receive programmatic access to the parsed data from the interface. While the parser 218, in an embodiment of the present invention, processes GDL files, other input file languages/formats (e.g., GPD, PPD, etc.) are supported in embodiments of the print manager 200.

A register method 1200 is called by a filter to register a file. Registering a file includes the parser 218 processing the file to render a tree structure representing the parsed filter information. The input to the register method 1200 is a name of a file containing the filter's descriptive data. A Get Parsed Filter Tree method 1210 provides a pointer to a tree corresponding to a previously parsed filter file. The method call references the corresponding original filter file by name. A Set Configuration method 1220 enables a caller to specify an existing job ticket or configuration information to be used by the parser 218 when evaluating the path for accessing data. In an embodiment of the invention, GDL files are utilized to describe filters. This is relevant in the case where switch/case is defined for features/options in the GDL. The Set Configuration 1220 method is called prior to getting a parsed filter tree since it specifies a current state for the switch/cases that drive completion of the parsed filter tree.

An Enumerate Entries method 1230 receives an entry type in a parsed file (e.g., GDL, GPD, etc.) to be enumerated. The Enumerate Entries method 1230 returns the entries that fit the specified entry type. By way of example, a GDL entry can be a constructType (e.g. *Feature, *Option) or an attribute (e.g. *Name, *SpotDiameter). The Enumerate Entries method 1230, and other methods calls to retrieve feature/capabilities information described herein below, enable clients to retrieve features supported by a filter path/pipeline. An Enumerate Construct Instances method 1240 receives a construct type in a parsed file to be enumerated. The Enumerate Construct Instances method 1240 returns a list of instance names for the specified construct. By way of example, if a Feature construct is specified, then the returned list contains all instance names with the Feature construct. For example, Paper Size, MediaType, Collate, etc.

A Get Recent Values method 1250 receives an attribute and returns a most recently defined value for the attribute. A Get Values method 1260 receives an attribute name and returns a value or list of values for the attribute. In an embodiment of the invention, a "recent" flag set in the method call retrieves only the most recently specified value for an attribute.

Turning to FIG. 13, the set of filters 204 each support a set of methods in the filter interface 222. An Initialize Filter method 1300 is called to initialize the filter at the time of installation. A call to the Initialize Filter method 1300 specifies a filter container that includes a filter information property tree that stores properties such as name, files, etc. The print manager 200 invokes the Initialize Filter method 1300 on a filter to notify and allow the called filter to perform initialization tasks. The initialization tasks are filter specific. For example, a filter that relies on some state information initializes the state. Another filter that relies on state information initializes the state. Yet another filter, for caching certain data, creates the cache. The types of filters, and thus types of initialization tasks, are unlimited. A Register Data method 1310 is called to invoke a return Register 1200 call by the filter to the parser 218 to register a file (e.g., GDL file). The call to the Register Data method 1310 includes a reference to the container for a filter and a reference to the IUnknown interface for the parser interface 216. A Delete Filter method 1320 invokes a clean-up operation on the filter. The call to the Delete Filter method 1320 includes a reference to the container for the filter that is to be deleted from the print system.

The set of methods for the User Interface interface 232 comprises a set of methods that support an integrated user interface for all filters in a filter path. In addition, each filter can present its own user interface that is presented to the application 202 without intervening processing by the print manager 200. As those skilled in the art will readily appreciate, there are many ways in which to implement the User Interface interface 232.

Another aspect of the print system, in an embodiment of the present invention, is a print schema that implicitly communicates information and requests between components of the print system. The meaning/relevance of information conveyed by property data defined according to the print schema is determined by individual recipient components (e.g., APIs) of the print system. The tagged properties of the print schema are grouped into a set of categories identified in FIG. 14. The categories imply a typical usage of a property and do not limit the particular use of the information. It is noted that the schema is hierarchical and thus properties themselves may include properties themselves (which may also include properties, etc.). In an embodiment of the invention, the schema is name-based, and all properties include associated keywords. Furthermore, all data defined in accordance with the schema include a data name, data type, and data value. It is further noted that the set of properties is exemplary, and will differ in various embodiments of the invention.

A page layout category 1400 includes properties that affect the layout of a page or range of pages. Examples of such properties include: scale, fit to page, scale to paper size, pages per sheet, negative image, mirror image (horizontal/vertical), watermark, paper size, media type (e.g., plain, transparency, bond, etc.), orientation, and input bin.

A rendering category 1410 includes tagged properties that affect the imaging part of the page. Examples of rendering properties include: color (monochrome/gray scale/color), print quality, resolution, Image Color Management (ICM) method, ICM intent, true type usage (download/substitute), font substitution (device font/system font), graphics mode (raster/vector), and page protection.

A finishing category 1420 includes properties that affect the finishing of a document or job. Examples of finishing properties include: duplex, staple, hole punch, binding, duplex unit (whether installed), stapler (whether installed), and binder (whether installed).

An output category 1430 includes properties specifying the destination or ordering of the output. The set of exemplary output properties include: collate, copies, page order (forward/reverse), and output bin.

An embodiment of the present invention includes a number of print schema categories for conveying various types of information. A document information category 1440 includes the following tagged properties: document name, document comment, and document output file. A job information category 1450 includes: job name, job owner, job comment, job password, job priority, job deadline time, job retention period, job submitted time, job scheduling, printer name requested, printer type requested, printer language requested, printer language level requested, printer output protocol, output format, job status, job data type, and job size. A printer information category 1460 includes tagged properties describing general printer information. The printer information properties include: printer comment, printer technology, printer print rate unit (e.g., pages per minute, characters per second, etc.), printer print rate, printer name, printer location, Bidi printer (true/false), printer shared (true/false), printer connection, printer publishing, and printer security. A driver information category 1470 includes: driver name, driver environment, driver path, driver render file, driver render version, driver data file, driver configuration file, driver configuration version, driver help file, driver dependent files, driver hardware ID. A port information category 1480 includes: port name, port type, and port status. A monitor information category 1490 includes: monitor name and monitor environment. A communication information category 1492 includes: BiDi Version (the version of the bidirectional schema in view of contemplated subsequent versions), connection state (whether connection is available), multi-channel (whether the language monitor supports multiple channel queries), BiDi Protocol (current protocol used in bidi communication), model (name of the print device model), and manufacturer. A configuration information category 1494 includes: installed printer memory, and postscript memory (for PS engine). An alert information category 1496 includes alerts of various types. A consumables information category 1498 includes consumables information of various types (e.g., printer ink). A maintenance information category 1499 includes various maintenance property types such as: clean head and align head.

Figure 15:
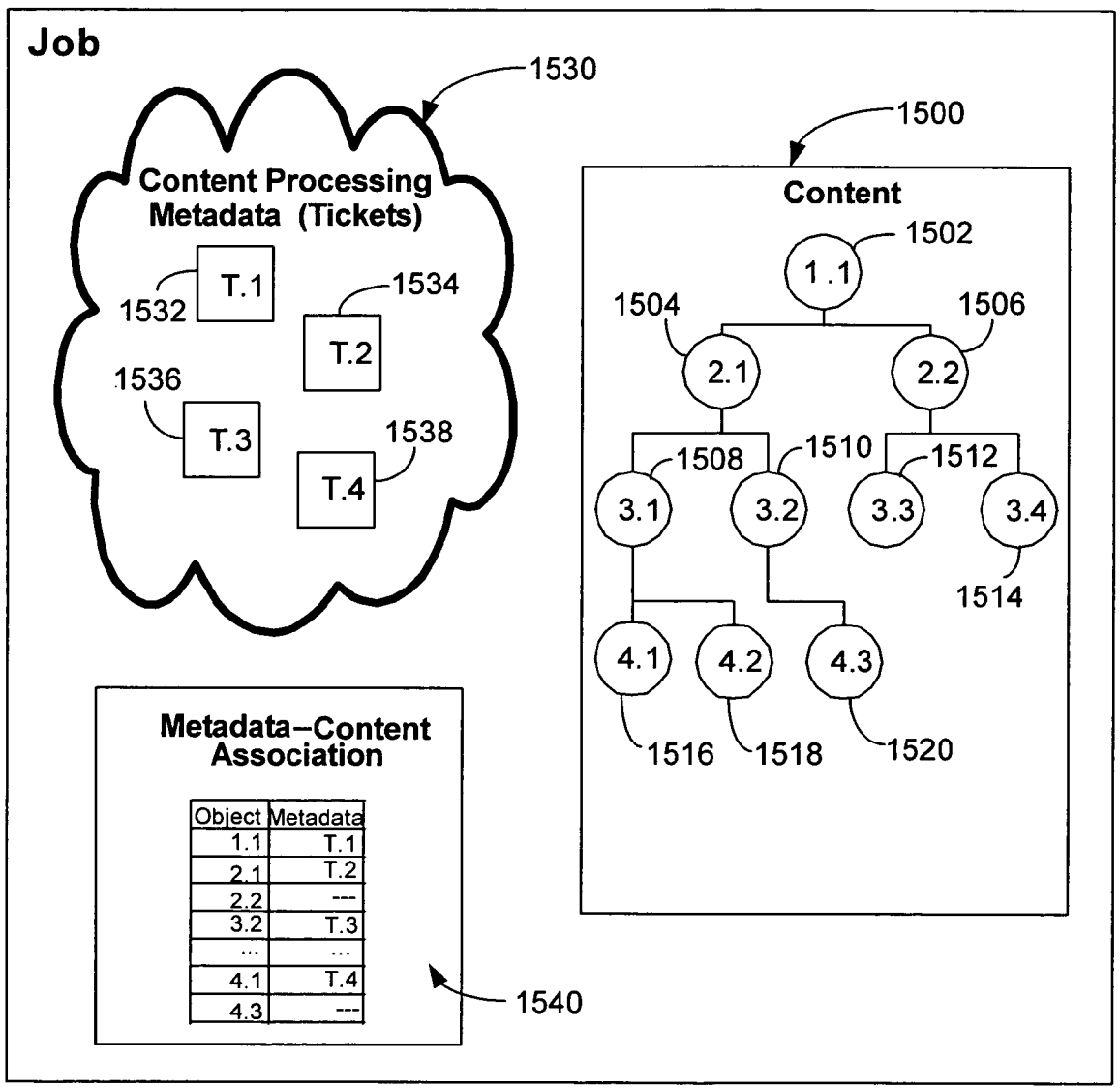
FIG. 15 depicts primary components of a multilevel ticket arrangement that facilitates flexibly designating features to be applied to identified content within a job.

Having described an exemplary print system architecture, attention is directed to a multilevel job (e.g., print job) ticket processing framework and methods that are carried out by, for example, the above-described print system. It is noted that in the description of the figures below, the term "ticket" is used rather than the term "job ticket" to avoid confusion between job tickets (as described/used herein above) and a ticket that is associated with a job-level content node. Turning to FIG. 15, an exemplary hierarchical ticket framework is illustratively depicted. In particular, a content structure (e.g., object) 1500 comprises a hierarchically arranged set (i.e. tree) of content nodes applicable to a particular job to be processed by a job manager (e.g., print manager 200). In an illustrative embodiment, each of the nodes within the content structure 1500 corresponds to a unit of content (e.g., a content object). In a particular illustrative embodiment such units of content within a hierarchical content structure represent a job (at a first (highest) level), a document (at a second level), a page (at a third level), and displayed objects within a page (at a fourth (lowest) level).

In the illustrative representation of the job content structure 1500, the content units are assigned identifiers corresponding to a level of the job content structure 1500 within which the content units reside. A second value (separated by any delimiter—e.g., a period) uniquely identifies the content unit from other content units that reside at the same level of the hierarchical job content structure 1500. Thus, in the illustrative example, the content structure 1500 includes a job node 1502 at the highest level that is assigned, by way of example, an identifier value "1.1". As those skilled in the art will readily appreciate, the use of an X.Y format for the identifier is merely exemplary and the content units can be identified in any of a number of ways without departing from the present invention.

With continued reference to the hierarchical content structure 1500, the job node 1502 references document nodes 1504 and 1506. The document nodes 1504 and 1506 are uniquely identified (in level-dot-constituent format) as nodes "2.1" and "2.2", respectively. In an embodiment of the invention, each document node (e.g., node 2.1) corresponds to one document that is be treated in a particular way as defined by property settings associated with the document node (including inherited property settings from a parent job node). However, in alternative embodiments of the invention, each document node references potentially multiple documents that are to be treated the same with regard to applying property settings. Thus, for example, where every document in a job has identical document settings, not only can a single document ticket be reused by document nodes, but also only a single document node is required.

The document nodes 1504 and 1506, in turn, reference a set of page nodes. In the illustrative embodiment, document node 1504 references page nodes 1508 and 1510 (assigned identifiers 3.1 and 3.2), and document node 1506 references page nodes 1512 and 1514 (assigned identifiers 3.3 and 3.4). In an embodiment of the invention, each page node (e.g., node 3.1) corresponds to a single page that is to be treated in a particular way as defined by property settings associated with the page node (including inherited property settings from a parent document node). However, in alternative embodiments, each page node references multiple, logically grouped, pages that are to be treated the same with regard to applying property settings. Thus, for example, where every page in a document has identical page settings, not only can a single page ticket be reused by page nodes, but also only a single page node is required.

In the illustrative embodiment a fourth level of content units are provided. Though not required, or even used in an embodiment of the invention, the added level is intended to represent that the model is extensible and can be augmented to include levels both above the job level and below the page level. For example, in the exemplary node structure depicted in FIG. 15, page node 1508 references sub-page nodes 1516 and 1518, and page node 1510 references sub-page node 1520. In an embodiment of the invention, sub-page nodes reference objects displayed/presented within the pages corresponding to their parent page nodes.

In the illustrative embodiment of the job management framework, property settings are specified within tickets that are collectively identified as content processing metadata 1530. In FIG. 15, content processing metadata 1530 includes a set of uniquely identified multilevel tickets 1532, 1534, 1536 and 1538 (identified as tickets T.1, T.2, T.3 and T.4, respectively). The choice of unique identifications for the multilevel tickets is arbitrary and need not convey information regarding appropriate levels. However, each ticket identifier should be distinguishable from the other ticket identifiers that make up the content processing metadata 1530. The structure and content of multilevel tickets (and their constituent elements) is described herein below with reference to FIGS. 16, 17 and 18. However, in general, each ticket contains metadata (e.g., property settings) applying to designated levels of the content structure 1500. In the illustrative embodiment provided herein, each element of the metadata identifies a level (e.g., job, document, page, etc.) of a print job content structure to which the element potentially applies.

A metadata-content association structure 1540 generated for the content structure 1500 specifies associations, if any, between nodes of the content structure (in the left-hand column) and tickets (listed, if applicable in the right-hand column) of the content processing metadata 1530. The associations specified by the metadata-content association structure 1540 defines how a job manager (e.g., print manager 200) processes the content structure 1500. In the illustrative embodiment of the invention, the associations define how a print manager 200 will apply a set of filters/features/property settings to content within a print file.

In an embodiment of the invention, ticket-content unit associations are defined within a file format. As those skilled in the art will readily appreciate, the associations/mapping between content units and tickets can be accomplished in any of a variety of ways without departing from the present invention. For example, rather than specify the associations in the structure 1540, the associations can be identified within optional fields supported by content structure 1500 or individual content nodes contained therein. However, regardless of how such associations are established, in accordance with an embodiment of the invention, a job manager (e.g., print manager 200), during the course of processing the job represented by the structures depicted in FIG. 15, merges the multilevel tickets associated with ancestor content nodes into a current child node. The merging operation is governed by a qualified inheritance rule such that, while merging, property settings specified by tickets connected to ancestor nodes are inherited by child nodes to the extent that the child nodes do not already specify a setting for a property identified within one of its ancestor nodes.

Figure 16:
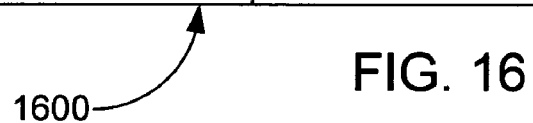
FIG. 16 depicts an exemplary structure for a multilevel ticket element.

Having described an exemplary multilevel ticket framework, attention is directed to the content and structure of exemplary multilevel tickets. Turning to FIG. 16, an exemplary ticket element structure 1600 is depicted. Each instance of a ticket element specifies a property setting for a job. A level identifier 1602 (also referred to as a "scope prefix") specifies a level within a content structure for a job (e.g., a print job) to which a particular element applies. In the illustrative embodiment of the invention, the value stored within the level identifier 1602 specifies a level supported by print content structures (e.g., job, document, page, etc.).

A property identifier 1604 designates a particular property applicable to the job (e.g., page size, orientation, duplex, etc.) or portion thereof designated by the level identifier. Finally, a setting value 1606 specifies an actual value associated with the property identifier 1604.

In an embodiment of the present invention, the value provided by the level identifier 1602, in addition to specifying a level to which the element is to be applied, also operates as a scope prefix that specifies a contextual scope for a property at least partially identified by the property identifier 1604. By way of example, a scope prefix is a textual label pre-pended to a job schema keyword specified by the property identifier 1604 to provide a contextual scope for the schema keyword.

Using the level identifier 1602 to specify a scope prefix enables a job schema designer/author to ascribe a specific and well-understood context to arbitrary keywords in a predefined manner. For example, consider six potentially designated properties labeled sequentially from '1' to '6', and each property has a potential level/scope/domain of application, categorized as 'A', 'B' and/or 'C'. Furthermore, let 'C' be a refinement of 'B', such that every object that is in category 'C' is also applicable to category 'B'. The job schema designer/author can define 'A', 'B' and 'C' as scope prefixes, and each prefix has a well-defined meaning and a possible relationship to the other prefixes. Under such circumstances, each ticket element is labeled with a scope prefix for a category to which the element belongs ('A1', 'C3', etc). This particular usage of the level identifier 1602 as a scope prefix (A, B, or C) defines the context of the numerically identified properties (1-6) identified in instances of the ticket element structure 1600 that are specified within a ticket structure described, by way of example, herein below with reference to FIG. 17.

Furthermore, the scope prefix specified by the level identifier 1602 potentially indicates that a job schema keyword (that is used at multiple levels) should be interpreted in a particular manner based upon the level/context specified by the level identifier 1602. For example, consider an instance where the property identifier 1604 has a value of 'Foo' that is paired with the level identifier 1602 having a value of either 'A' or 'B'. Furthermore, the property identifier 'Foo' is dependent on its context (specified by the level identifier 1602). The job schema author defines 'A' and 'B' as scope prefixes, which results in the compound keywords 'AFoo' and 'BFoo'. Each of these keywords represents a different meaning, as indicated by the scope prefix, and therefore 'AFoo' is not equivalent to 'BFoo'. An example of using such compound keywords in a print job schema is Job/Document in combination with Duplex which results in the distinct compound keywords of JobDuplex and DocDuplex to signify the scope of a duplex property as applicable to either a job or a single document.

Finally, it is noted that while the scope prefix matches a job level in the aforementioned description of the element structure 1600, in alternative embodiments of the invention, the scope prefix and level are separately designated fields within the ticket element structure 1600. The "level" of the ticket is determined by the content with which a ticket is associated (e.g., a ticket associated with a document is a document-level ticket).

In addition to defining a scope/level of usage, an embodiment of the invention utilizes scope prefix functionality of the level identifier 1602 to restrict application of a keyword specified in the property identifier 1604 to particular levels of a job schema hierarchy. The level identifier 1604 enables a job schema author/designer to define levels of a hierarchical content structure to which a specified keyword is applicable. For example, two hierarchical levels are specified within a job schema, denoted by Ln, where n=1,2, and L2 is the descendant of L1. Furthermore, there are two keywords "Foo" and "Bar" and two scope prefixes, A and B. The job schema author determines that the context indicated by scope prefix A is applicable to both L1 (high level) and L2 (low level), whereas scope prefix B is only applicable to L1. Furthermore, the schema author determines that "Foo" is applicable in the contexts of both scope prefix A and B, whereas "Bar" is only applicable to the context of scope prefix B (i.e., ABar is not a proper compound keyword within the schema). Given these rules, the scope prefix facilitates automatically determining which hierarchy levels a scoped keyword may appear in. In this case "AFoo" may appear in either level L1 or L2, while "BFoo" and "BBar" can only appear in L2. The context, as identified by the "B" scope prefix, for "BFoo" and "BBar" is the same, and the meaning of "AFoo" is the same regardless of the level it appears at.

An exemplary application of a level identifier being utilized as a scope prefix within a multilevel ticket-based printing system is described herein below. In this example, the property settings guide/define formatting of print jobs. However, the example below is for illustration only and does not limit the invention.

At the highest level of the content hierarchy, a job level ticket contains property settings to be applied, if not overridden, to an entire job. Elements within the job level ticket are permitted to designate scope prefixes of "job", "document" and "page." Settings specified in the job level ticket are applied to (i.e., merged with) document and page level tickets according to inheritance/overriding behaviors described herein.

A document level ticket incorporates job formatting settings to be applied, if not overridden, to one or multiple documents in a job. The elements within a merged document level ticket potentially include settings previously specified in a parent job level ticket. Only elements with scope prefixes of "Document" or "Page" are applicable for a document level ticket (i.e., one that is associated with a document level content node). The page settings specified by elements in a document level ticket are applied to (i.e., merged with) page level tickets according to inheritance/overriding behaviors described herein.

A page level ticket incorporates job formatting settings to be applied, if not overridden, to one or more pages of a job (i.e., not limited to a single document). The page settings potentially include settings previously specified in a job level or document level ticket. Only Elements with scope prefixes (e.g., level identifications) of "page" are allowed in a page level ticket. The page level settings of higher level tickets are applied to (merged with) the page level tickets according to inheritance/overriding behaviors described herein.

Figure 17:
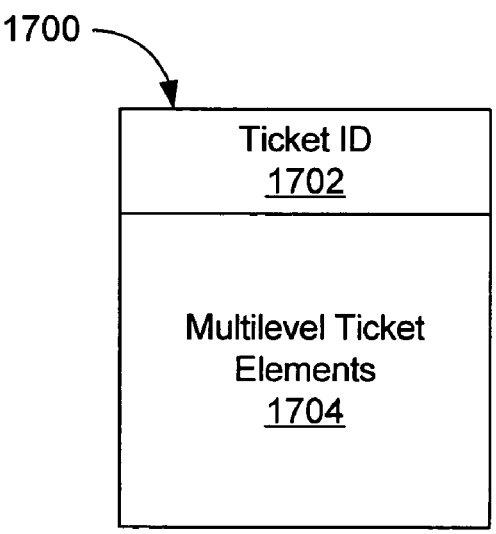
FIG. 17 depicts an exemplary ticket structure.

Turning to FIG. 17, a multilevel ticket structure 1700 is associated with an identifier 1702 that uniquely identifies the ticket. The identifier, which can take any of a variety of forms (e.g., based upon where the ticket is stored, explicitly defined by a tag, etc.) facilitates specifying an association between the ticket and job content. The ticket structure 1700 also includes a set of ticket elements 1704. Each ticket element, as explained above with reference to FIG. 16, specifies a level identifier, a property identifier, and a setting value for a property associated with the property identifier. The multilevel ticket structure 1700 supports designating property settings at multiple levels of a job content hierarchy.

The multilevel ticket structure and job management framework disclosed herein introduces the concept of a multilevel hierarchy of job schema structures. The hierarchy allows a schema author to logically express relationships between schema structures to reflect real-world constructs. For example, an object of type Y (with a particular instance Y1) is composed of multiple objects of type Z (with particular instances Zn, where n=1 . . . 6), and a user wishes to describe these objects. Within the multi-level hierarchy, a single schema document for object Y1 not only describes object Y1, but also describes settings that apply to all objects Zn. The objects Zn inherit property settings from object Y1, or, in other words, are descendants of object Y1, within the hierarchy.

For the job schema structures that describe objects Zn, there are two options. A single schema structure is specified for each object of type Z. Alternatively, a schema structure is specified that applies to more than one object of type Z. By way of example, objects Zj, j=1, 2, 3 are identical and objects Zk, k=4, 5, 6 are each unique. In this case four distinct schema structures are needed. One schema describes all Zj objects, and three schema structures describe the three uniquely treated Zk objects. It is further noted that, in an embodiment of the present invention, a schema structure for an object cannot describe settings for the object's ancestors. Therefore, in the above example, the schema structure for object Zn cannot describe object Y1.

This invention also allows a well-defined inheritance and merging behavior between different schema levels, as discussed throughout this written description, and more particularly with reference to merger operations discussed herein below with reference to a method for generating output for a print job.

The following illustrates a particular application of a multilevel hierarchy of schema structures in a hierarchical ticketing system designed to describe job formatting settings; however, the example is for illustration only and does not limit the invention to this particular scenario. To facilitate flexible and powerful application of job formatting settings across the components of a job, a ticket is broken down into three hierarchically specified levels representing the job (at a highest level), documents within the job, and pages within each document.

The levels specified for defining settings for a print job are ranked according to specificity. The Job Level is most general, the document level is more specific, and the Page Level is most specific. Within this framework, a hierarchy is imposed such that there is an implicit inheritance relationship between lower level tickets and their ancestors. The characteristics of the inheritance relationship are twofold. First, the ticket levels support setting job formatting properties to be pushed down from more general tickets (e.g., job level) to more specific tickets (e.g., document and page levels). The above-described inheritance behavior simplifies applying identical settings to a set of lower level content units (e.g., document and page) of a job. In a simplest case where each document and page is to be printed using a single set of uniform property settings, the settings can be specified in a single ticket associated with a single job content unit (e.g., job node 1502). Every document in the job and every page in each document will inherit the settings specified in the single ticket associated with the job content unit.

The inheritance behavior between a more general and a more specific level ticket is a one-to-many relationship. In the illustrative embodiment, multiple document level tickets inherit from a single job level ticket. However, a document level ticket can inherit property settings from only one job level ticket. The same inheritance behavior holds between a job level ticket and page level tickets and between a document level ticket and page level tickets.

Second, a property setting specified by a ticket associated with a content node at a higher, more general, level (e.g., a document content node) is overridden by a different setting for the property specified within a ticket associated with a lower level content node (e.g., a page content node) if it is repeated at a more specific level. An application of the above-described "overriding" behavior can be implemented to specify identical "page" property settings for an entire job or entire document with the exception of a single page that requires different settings that are specified by a ticket associated with a page content node for the single page. These two behaviors, inheritance and overriding, are depicted in FIG. 18 described further herein below.

Figure 18:
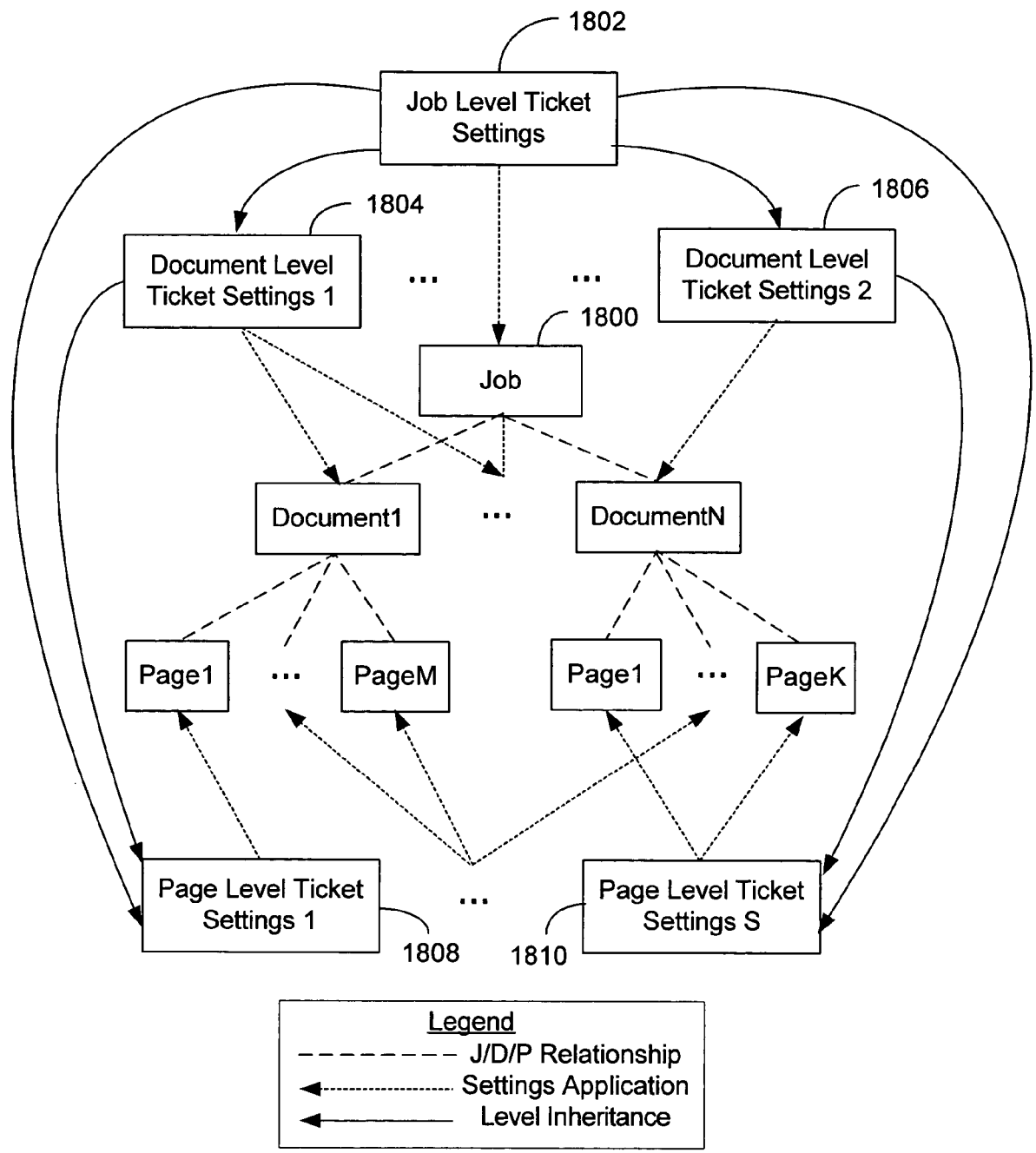
FIG. 18 illustratively depicts the inheritance relationships between various tickets associated with particular content units of a print job.

Referring to FIG. 18, a schematic diagram illustratively depicts applying property settings specified within tickets to a print job and its hierarchically arranged content units (i.e., job, document and page components). Settings with a scope prefix "Job" are applied to a job component 1800 only from a job level ticket settings 1802. There is a one-to-one mapping between the job level ticket settings 1802 and the job component 1800. Document level ticket settings 1804 and 1806 with a scope prefix (i.e., level identifier) of "document" are applied to a document component (e.g., Document 1, . . . Document N) directly from a document level ticket or inherited from the job level ticket settings 1802. There is a one-to-many mapping between document level ticket settings and document components.

Page level ticket settings 1808 and 1810 are applied to a page component (e.g., Page 1, . . . , M of Document 1, and Page 1, . . . , Page K of Document N) directly from a page level ticket or inherited from page level settings specified within either a job level ticket or a document level ticket. The document level ticket supplying the page level settings must be the ticket that applies to a document component of which the supplied page component is a part.

Figure 19:
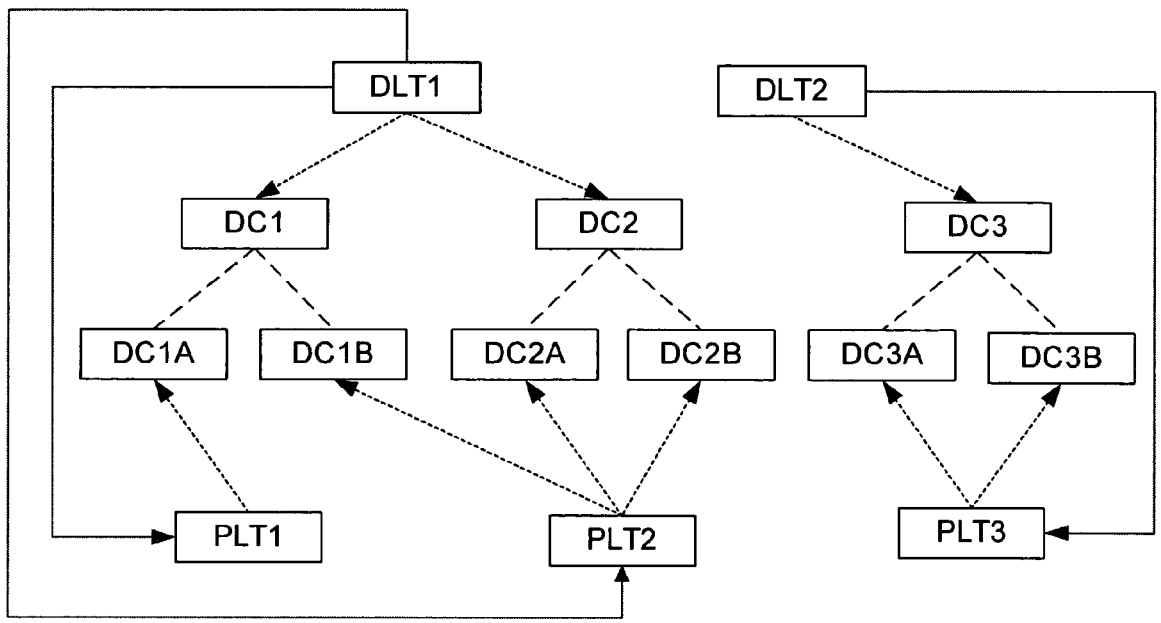
FIG. 19 illustratively depicts a particular example of an inheritance relation between settings specified by multilevel tickets and associated job content components.

Turning briefly to FIG. 19, the above restriction is demonstrated by the following example. A job consists of three document components DCn where n=1, 2, 3. Furthermore, each of the document components has: two page components DCnm, where m=A,B; two Document Level Ticket DLTi, i=1,2; and three Page Level Tickets PLTj, j=1, 2, 3. PLT1 and PLT2 inherit from DLT1 while PLT3 inherits from DLT2. DLT1 is applied to DC1 and DC2. According to the hierarchy, only PLT1 or PLT2 (not PLT3) can be applied to Page components DC1$m$ and DC2$m$. Furthermore, neither PLT1 nor PLT2 can apply to DC3$m$.

Figure 20:
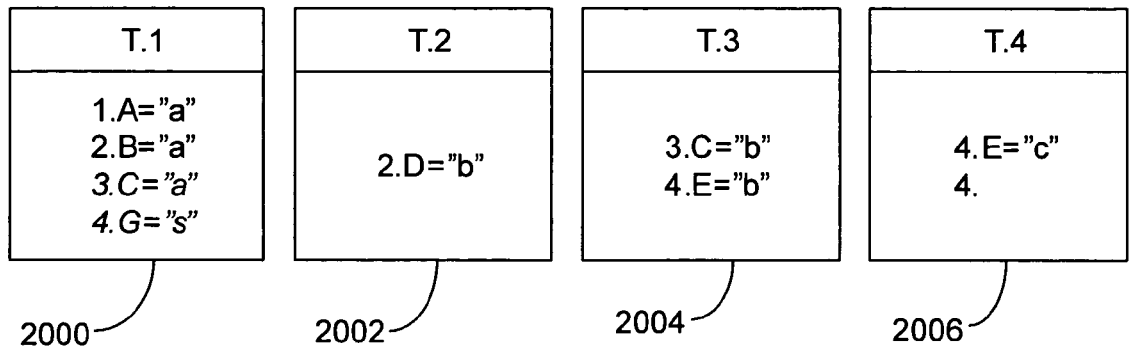
FIG. 20 depicts a representation of a set of four tickets.

Turning to FIG. 20, a set of four exemplary tickets are depicted. Each element within the tickets includes a level identifier/scope prefix that identifies the content level at which the ticket element should be applied, a property identification, and a setting value. Ticket 2000, identified as "T.1", includes four ticket elements (one for each level identified in FIG. 15). With regard to the actual content of the ticket elements, a first element within ticket 2000 specifies a level/scope prefix of "1", a property identifier of "A" and a setting of "a". A second element specifies a level 2, property "B" and setting "a". A third element specifies a level 3, property "C" and setting "a". A fourth element in ticket 2000 specifies a level 4 and a setting "s" for a property "G". Ticket 2002 includes a single, level 2 property setting element. Ticket 2004 includes one level 3 property setting element and one level 4 property setting element, and ticket 2006 includes two level 4 property setting elements. It is noted that applicability of elements within tickets is limited by the level of the content node with which the ticket containing the elements is associated. In particular, an element can only be applied if the specified level of the associated content node is the same or higher than the element's level.

Figure 21:
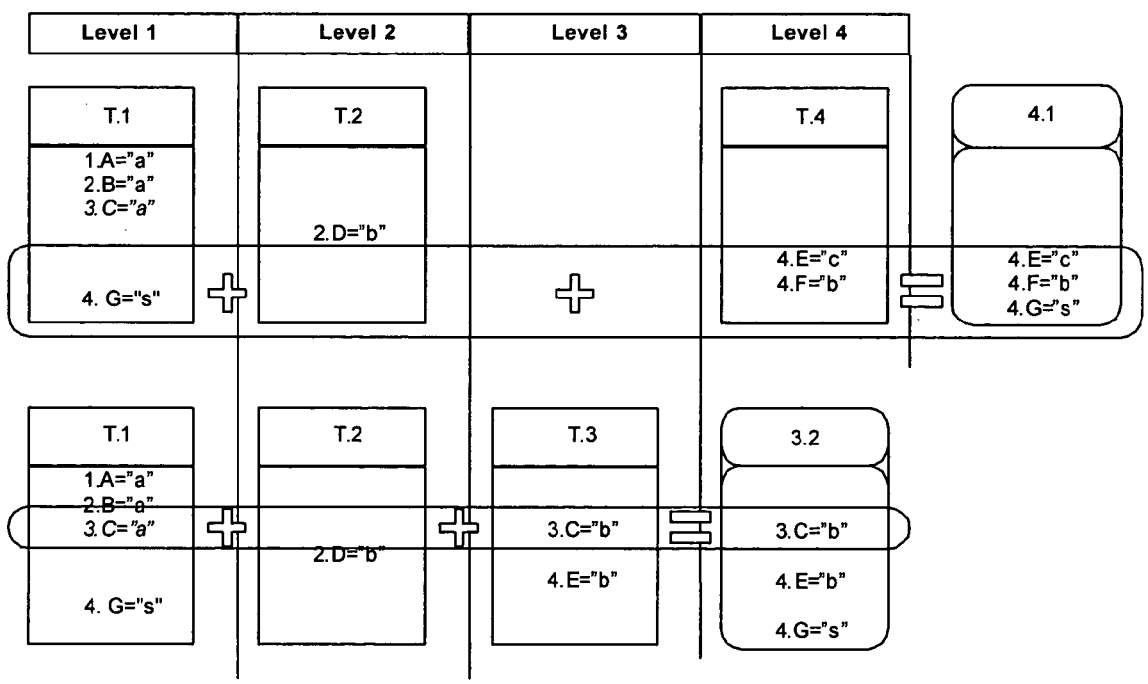
FIG. 21 illustratively depicts a feature resolution operation performed by a job manager on a set of elements specified by a set of hierarchical tickets to render merged properties/features in accordance with an embodiment of the present invention.

Turning to FIG. 21, two examples are provided of merging tickets to render settings for a particular content node. The content node hierarchy and ticket associations are taken from FIG. 15. The first example demonstrates inheritance behavior, the second example demonstrates inheritance and overriding behaviors. Each column represents a content level of a content unit that specifies an identified ticket. The last block in each row represents the merged ticket for an identified content unit (i.e., 4.1 for the first row and 3.2 for the second row).

Row 1 illustrates merger of tickets referenced by content node 4.1 and its ancestors to render a merged ticket for content node 4.1. All tickets that are associated with content node 4.1 and the content node ancestors of 4.1 are compiled. In the illustrative example, the applicable tickets are T.1, T.2 and T.4. From these tickets, all settings prefixed with level "4" comprise the settings for content node 4.1. In this case, setting 4.G="s" is inherited from T.1 to T.4 (i.e., from the more general ticket to the more specific ticket).

Row 2 illustrates merger of tickets referenced by content node 3.2. Here the tickets associated with 3.1 and its ancestors are T.1, T.2 and T.3. From these tickets all settings prefixed with level "3" and any more specific levels (in this case level "4") comprise the settings for content 3.1. In this example, there is a setting conflict for the property "C" between a level 1 ticket and a level 3 ticket. In accordance with the previously described override behavior, the setting "b" specified for property "C" by the level 3 ticket overrides the setting "a" specified for property "C" by the (less specific) level 1 ticket for property C.

Figure 22:
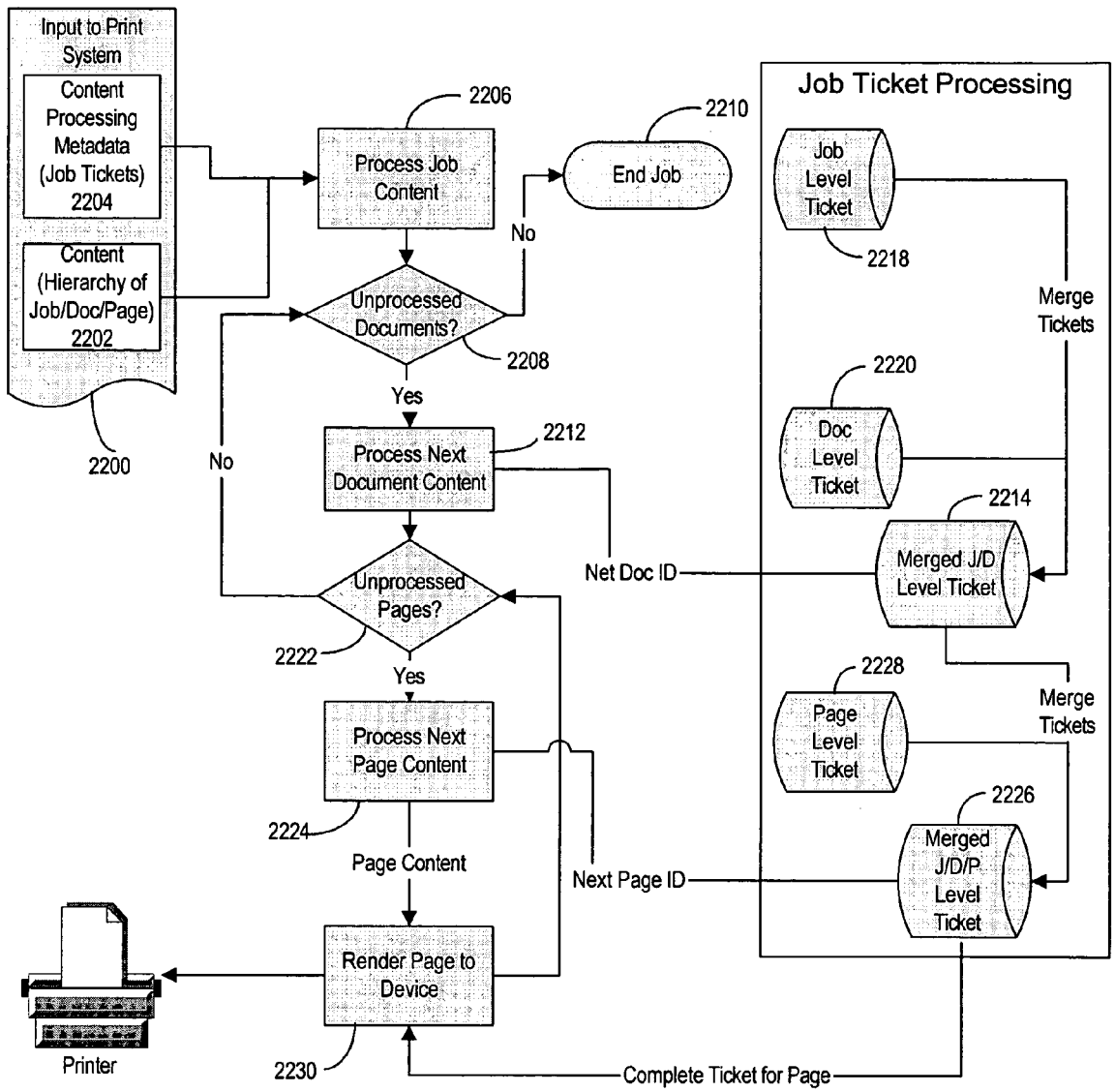
FIG. 22 is a flowchart summarizing steps associated with processing a print request according to designated content, tickets, and associations specified between the content and tickets in accordance with an embodiment of the present invention.

Turning to FIG. 22, a flowchart summarizes general steps associated with processing a print job 2200 comprising content 2202 (comprising hierarchically arranged content nodes) and content processing metadata 2204 (multilevel tickets). At step 2206, a print system receives the print job 2200 and initially processes the job content node within the content 2202. Thereafter, at step 2208 if all document content nodes within the job have been processed, then control passes to the End 2210. However, if unprocessed document content nodes remain, then control passes to step 2212.

At step 2212 the print system processes the next document content node. As part of the document content node processing, a document content node identification is provided (as indicated by the line between step 2212 and a merged job/document level ticket 2214) to a ticket processing module 2216. The merged job/document level ticket 2214 is obtained by merging a current job level ticket 2218 and document level ticket 2220 according to a multilevel ticket interaction scheme described herein below.

The job completion architecture disclosed herein incorporates the concept of setting interaction in a hierarchy of schema-based documents that define property settings for processing a job/request. For the sake of consistency with previous examples, there is a job schema document Y1, that has three descendent schema documents Zn, n=1 . . . 3. First, property settings can be inherited from an entity at a first level by any descendants of that entity at lower levels. In the given example, lets say that there is a property with a scope prefix 'Z' named 'Foo' in the schema Y1. If the setting 'ZFoo' is not listed in a schema document Zn, then setting for property 'ZFoo' is applied to the entity (e.g., content node) described by schema document Zn. Second, property settings inherited from any ancestor schema documents, if specified by the current schema document, are overridden by the settings specified in the current schema document. To illustrate this, consider a second property 'ZBar' in the ancestor schema document Y1. Furthermore, schema documents Z1 and Z2 have not defined a setting for 'ZBar', but schema document Z3 has. In this case, schema documents Z1 and Z2 will inherit the setting for property 'ZBar' defined in schema document Y1. However, schema document Z3 will not inherit this value, and instead the setting provided by Y1 for 'ZBar' is overridden by the value specified for 'ZBar' within schema document Z3. The above-described interaction behaviors drive the completion of the merger operations performed by the ticket processing component 2216.

The following is an illustrative example of how scope prefixed keywords can be handled in the inheritance/override model when processing print jobs according to property settings provided within multilevel tickets. Job settings are expressed by print schema framework elements. Elements that interact between job ticket levels are specified at the root level of each level ticket. A conflict between ticket elements is defined as the same root level element, as denoted by an XML Attribute "Name", appearing in multiple Level tickets. There are two options for interactions. First, if there is no conflict, a prefix scoped element is pushed down, or inherited, from a more general ticket to a more specific ticket. This case is isomorphic to the case where both tickets contain an identical element. Second, if there is a conflict, the setting from the most specific ticket takes precedence. That is, per page settings in a page level ticket override settings for identical per page properties specified in a document or job level ticket. Similarly, document settings in the document Level ticket take precedence over document settings in the job level ticket.

With continued reference to FIG. 22, upon completing step 2212, control passes to step 2222 wherein if all page content nodes within the current document have been processed, then control returns to step 2208. Otherwise control passes to step 2224. At step 2224 the print system processes the next page content node. As part of the page content node processing, a page content node identification is provided (as indicated by the line between step 2224 and a merged job/document/page level ticket 2226. The merged job/document/page level ticket 2226 is obtained by merging a current page level ticket 2228 with the merged job/document level ticket for the current document with which the current page is associated. As indicated in the figure, the merged job/document/page level ticket 2226 is provided as input, along with actual content for the page, to a page rendering engine that renders the page during step 2230. Thereafter, the output is provided to a printer 2232 (or any other suitable output display device).

It is noted that the above-described framework is directed to utilizing a hierarchical job-ticket based system for specifying a job to be carried out by a consumer (e.g., a print system including operating system and third party driver components). However, the multi-level and prefix-scope print schema aspects of the disclosed job ticket hierarchy are also applied to device capability communications provided by the consumer to an application (producer of job tickets). Thus, an application communicates settings to a consumer via multi-level job tickets embodying the hierarchical processing conventions disclosed herein. Furthermore, the same multi-level conventions are also incorporated into device capabilities communications provided by the consumer to the application (that are then used to generate job tickets). Of course, in contrast to job ticket processing, device capabilities are not merged.

Having described, by way of example, a framework and method for carrying out a job completion architecture that utilized multilevel tickets, a series of pseudo-code and schema segments are provided that embody the above-described multilevel ticket job completion architecture.

Merging Code Algorithm.

The following is a pseudo code example for the merging algorithm. The algorithm is applied iteratively on pairs of tickets within the Job Ticket hierarchy during merging operations.

```
MergeTickets( JobTicket Base, JobTicket Delta ) : JobTicket
{
    // Given tickets J and J', where J' is a logical child of J in the
    // hierarchy, when merging, options specified in features in J' override
    // options in J for features of the same name and scoping
    // prefix. Likewise, parameters initializers in J' override parameter
    // initializers in J for parameter initializers with the same name and
    // scoping prefix.
    J = new JobTicket(Base);
    foreach( Feature f in Delta )
    {
        J[f] = Delta[f];
    }
    foreach( Parameter p in Delta )
    {
        J[p] = Delta[p];
    }
}
```

```
GetMergedTicket( Object X ) : JobTicket
{
    // O is an object in a hierarchy of objects that have
tickets associated
    // with them.
    // The result from GetMergedTicket is the complete set of
settings
    // as it applies to a specific object in the hierarchy,
including all
    // settings inherited from it's parent.
    if( exists( X.Parent )
    {
    return MergeTickets( GetMergedTicket(X.Parent),
X.getTicket );
    } else {
    return X.getTicket;
    }
}
```

Sample XML Code Illustrating the Job Level Prefixes.

This sample shows how the same feature may be interpreted differently based on the scoping prefix.

```
<!--
    FEATURE: BannerSheet
    SCOPE: Document
    SUMMARY: Describes the banner sheet. Each document
will have a separate sheet.
    -->
    <Feature Name="psk:DocumentBannerSheet">
        <Property Name="psk:UIType">
            <Value xsi:type="xs:string">PickOne</Value>
        </Property>
        <!-- Specifies a custom banner sheet should be output.
        -->
        <Option Name="psk:Custom">
            <ScoredProperty Name="psk:BannerSheetSource">
                <ParameterRef Name="psk:DocumentBannerSheetSource"
/>
            </ScoredProperty>
        </Option>
        <!-- Specifies no banner sheet should be output. -->
        <Option Name="psk:None">
            <Property Name="psk:IdentityOption">
                <Value xsi:type="xs:string">True</Value>
            </Property>
        </Option>
        <!-- Specifies the standard (device defined) banner
sheet should be output. -->
        <Option Name="psk:Standard" />
    </Feature>
    <!--
    FEATURE: BannerSheet
    SCOPE: Job
    SUMMARY: Describes the banner sheet. The entire job
will have a single sheet.
    -->
    <Feature Name="psk:JobBannerSheet">
        <Property Name="psk:UIType">
            <Value xsi:type="xs:string">PickOne</Value>
        </Property>
        <!-- Specifies a custom banner sheet should be output.
        -->
        <Option Name="psk:Custom">
            <ScoredProperty Name="psk:BannerSheetSource">
                <ParameterRef Name="psk:JobBannerSheetSource" />
            </ScoredProperty>
        </Option>
        <!-- Specifies no banner sheet should be output. -->
        <Option Name="psk:None">
            <Property Name="psk:IdentityOption">
                <Value xsi:type="xs:string">True</Value>
            </Property>
        </Option>
        <!-- Specifies the standard (device defined) banner
sheet should be output. -->
        <Option Name="psk:Standard" />
    </Feature>
```

Sample XML Code Illustrating the Multi-Level Job Ticket Hierarchy.

This sample includes three tickets: one Job Level ticket and two Page Level tickets. The "PageSettings1" ticket applies to multiple page objects.

```
<!-- Job Level Ticket Example - Applies to entire Job -->
<JobTicket Version="1">
    <Feature Name="psk:PageMediaSize">
        <Option Name="psk:Letter">
            <Property Name="psk:IdentityOption">
                <Value xsi:type="xs:string">True</Value>
            </Property>
            <ScoredProperty Name="psk:MediaSizeX">
                <Value xsi:type="xs:integer">215900</Value>
            </ScoredProperty>
            <ScoredProperty Name="psk:MediaSizeY">
                <Value xsi:type="xs:integer">279400</Value>
            </ScoredProperty>
            <ScoredProperty Name="psk:FeedOrientation">
                <Value xsi:type="xs:string">ShortEdgeFirst</Value>
            </ScoredProperty>
            <Property Name="psk:StandardOrientation">
                <Value xsi:type="xs:string">Portrait</Value>
            </Property>
        </Option>
    </Feature>
    <Property Name="psk:JobName">
        <Value xsi:type="xs:string">JobSettings1</Value>
    </Property>
    <Feature Name="psk:PageOrientation">
        <Property Name="psk:UIType">
            <Value xsi:type="xs:string">PickOne</Value>
        </Property>
        <Option Name="psk:Portrait">
            <Property Name="psk:IdentityOption">
                <Value xsi:type="xs:string">True</Value>
            </Property>
        </Option>
    </Feature>
</JobTicket>
<!-- Page Level Ticket Example - Pages 1-3, 5 -->
<JobTicket Version="1">
    <Property Name="psk:PageName">
        <Value xsi:type="xs:string">PageSettings1</Value>
    </Property>
</JobTicket>
<!-- Page Level Ticket Example - Page 4 Only -->
<JobTicket Version="1">
    <Property Name="psk:PageName">
        <Value xsi:type="xs:string">PageSettings2</Value>
    </Property>
    <Feature Name="psk:PageOrientation">
        <Option Name="psk:Landscape" />
    </Feature>
</JobTicket>
```

Sample XML Code Illustrating the Merging of the Multi-Level Job Ticket Hierarchy.

This sample illustrates how the hierarchy of tickets may be merged to create the final ticket for processing (per page).

```
<!-- Page Level Ticket Example - Pages 1-3, 5 -->
<JobTicket Version="1">
    <Feature Name="psk:PageMediaSize">
        <Option Name="psk:Letter">
            <Property Name="psk:IdentityOption">
                <Value xsi:type="xs:string">True</Value>
```

```
        </Property>
        <ScoredProperty Name="psk:MediaSizeX">
            <Value xsi:type="xs:integer">215900</Value>
        </ScoredProperty>
        <ScoredProperty Name="psk:MediaSizeY">
            <Value xsi:type="xs:integer">279400</Value>
        </ScoredProperty>
        <ScoredProperty Name="psk:FeedOrientation">
            <Value xsi:type="xs:string">ShortEdgeFirst</Value>
        </ScoredProperty>
        <Property Name="psk:StandardOrientation">
            <Value xsi:type="xs:string">Portrait</Value>
        </Property>
      </Option>
    </Feature>
    <Property Name="psk:JobName">
        <Value xsi:type="xs:string">JobSettings1</Value>
    </Property>
    <Property Name="psk:PageName">
        <Value xsi:type="xs:string">PageSettings1</Value>
    </Property>
    <Feature Name="psk:PageOrientation">
      <Property Name="psk:UIType">
          <Value xsi:type="xs:string">PickOne</Value>
      </Property>
      <Option Name="psk:Portrait">
        <Property Name="psk:IdentityOption">
            <Value xsi:type="xs:string">True</Value>
        </Property>
      </Option>
    </Feature>
</JobTicket>
<!-- Page Level Ticket Example - Page 4 Only -->
<JobTicket Version="1">
    <Feature Name="psk:PageMediaSize">
      <Option Name="psk:Letter">
        <Property Name="psk:IdentityOption">
            <Value xsi:type="xs:string">True</Value>
        </Property>
        <ScoredProperty Name="psk:MediaSizeX">
            <Value xsi:type="xs:integer">215900</Value>
        </ScoredProperty>
        <ScoredProperty Name="psk:MediaSizeY">
            <Value xsi:type="xs:integer">279400</Value>
        </ScoredProperty>
        <ScoredProperty Name="psk:FeedOrientation">
            <Value xsi:type="xs:string">ShortEdgeFirst</Value>
        </ScoredProperty>
        <Property Name="psk:StandardOrientation">
            <Value xsi:type="xs:string">Portrait</Value>
        </Property>
      </Option>
    </Feature>
    <Property Name="psk:PageName">
        <Value xsi:type="xs:string">PageSettings2</Value>
    </Property>
    <Feature Name="psk:PageOrientation">
        <Option Name="psk:Landscape" />
    </Feature>
</JobTicket>
```

It will be appreciated by those skilled in the art that a new and useful method and system has been described for managing job completion within a computing device. In view of the many possible environments to which the principles of this invention may be applied and the flexibility of designing and carrying out software utilities and tools, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A computer-readable storage media having one or more data structures stored thereon for implementing a job management framework, for managing operations executed by devices having potentially multiple distinct personalities, the job management framework comprising:
   a set of hierarchically arranged print content units comprising at least a first content unit at a first hierarchical level and a second content unit at a second hierarchical level, and wherein the first hierarchical level is higher than the second hierarchical level;
   a set of multilevel tickets comprising multiple job tickets, wherein each job ticket comprises a tree of properties to be applied by a job manager during execution of an operation, the tree of properties of each job ticket comprising a set of ticket elements, wherein each ticket element comprises:
   a level identifier specifying a scope prefix and a level of a set of levels within a content structure of a job supported by the ticket, and
   a property identifier designating a particular property applicable to the job, wherein the scope prefix specified by the level identifier is configured to define one or more levels of the set of levels to which a property specified in the property identifier is applicable, and facilitate determination of which level of the set of levels the property is allowed to appear, and
   a plurality of filters that perform a plurality of print request execution functions according to a set of features identified in a feature descriptor of a print device,
   wherein the job manager comprises a print manager configured to allow the plurality of filters to register a plurality of features supported by the plurality of filters, and support pipelining multiple filters of the plurality of filters, wherein:
   the feature descriptor describes one or more capabilities associated with the print device,
   filter pipelining allows a stream of print jobs to pass through a set of designated one of the filters, wherein the tree of properties of each job ticket identifies which filter of the plurality of filters is to performs a function, and which filter of the plurality of filters is to allow a job associated with the job ticket to pass through without any processing, and
   at least one filter of the plurality of filters is configured to process different parts of the job associated with the job ticket in parallel.

2. The job management framework of claim 1 wherein each job ticket further comprises:
   a setting value for the property associated with the property identifier.

3. The job management framework of claim 1 wherein the operation comprises generating displayable output.

4. The job management framework of claim 1 wherein the operation comprises generating printer output.

5. The job management framework of claim 2, wherein the level identifier is capable of designating a level from the set of levels including the second level corresponding to a page, and a first level corresponding to a document.

6. The job management framework of claim 5 wherein the set of levels further includes a third level, above the first level, corresponding to the job.

7. The job management framework of claim 2 wherein the set of levels includes distinct levels corresponding to: individual data elements, grouped data elements, and collections of grouped data elements.

8. A multilevel job ticket, embedded as data structures in a computer-readable storage medium, for specifying property setting applicable to content associated with an operation performed by a print manager within a computing system, the multilevel job ticket comprises a tree of properties to be applied by a job manager during execution of an operation, the multilevel job ticket comprising:

a set of ticket elements, wherein each ticket element specifies:

a level identifier specifying a scope prefix and a level of a set of levels within a content structure of a job supported by the multilevel ticket, a property identifier designating a particular property applicable to the job, wherein the scope prefix specified by the level identifier is configured to define one or more levels of the set of levels to which a property specified in the property identifier is applicable, and facilitate determination of which level of the set of levels the property is allowed to appear, and a setting value for the property associated with the property identifier;

wherein the job manager comprises a print manager configured to allow a plurality of filters to register a plurality of features supported by the plurality of filters, and support pipelining multiple filters of the plurality of filters, wherein:

the plurality of filters perform a plurality of print request execution functions according to a set of features identified in a feature descriptor of a print device, the feature descriptor describes one or more capabilities associated with the print device, filter pipelining allows a stream of print jobs to pass through a set of designated one of the filters, wherein the tree of properties of each job ticket identifies which filter of the plurality of filters is to performs a function, and which filter of the plurality of filters is to allow a job associated with the job ticket to pass through without any processing, and at least one filter of the plurality of filters is configured to process different parts of the job associated with the job ticket in parallel.

9. The multilevel ticket of claim 8 wherein the set of levels includes distinct levels corresponding to: individual data elements, grouped data elements, and collections of grouped data elements.

10. The multilevel ticket of claim 8 wherein the operation comprises generating displayable output.

11. The multilevel ticket of claim 8 wherein the operation comprises generating printer output.

12. A computer-implemented method for completing an operation according to a set of multilevel tickets associated with a set of hierarchically arranged print content units, comprising at least first content unit at a first hierarchical level and a second content unit at a second hierarchical level, and wherein the first hierarchical level is higher than the second hierarchical level, the computer implemented method comprising:

applying, by a job manager during execution of an operation, a tree of properties to each multiple job tickets wherein the set of multilevel tickets comprises the multiple job tickets and the tree of properties of each job ticket comprising a set of ticket elements, wherein each ticket element comprises:

a level identifier specifying a scope prefix and a level of a set of levels within a content structure of a job supported by the ticket, and a property identifier designating a particular property applicable to the job, wherein the scope prefix specified by the level identifier is configured to define one or more levels of the set of levels to which a property specified in the property identifier is applicable, and facilitate determination of which level of the set of levels the property is allowed to appear, and configuring a print manager to allow a plurality of filters that perform a plurality of print request execution functions identified in a feature descriptor of a print device to register a plurality of feature supported by the plurality of filters, and support pipelining multiple filters of the plurality of filters, wherein:

the feature descriptor describes one or more capabilities associated with the print device, filter pipelining allows a stream of print jobs to pass through a set of designated one of the filters, wherein the tree of properties of each job ticket identifies which filter of the plurality of filters is to performs a function, and which filter of the plurality of filters is to allow a job associated with the job ticket to pass through without any processing, and at least one filter of the plurality of filters is configured to process different parts of the job associated with the job ticket in parallel.

13. The method of claim 12 wherein each ticket comprises:
a set of ticket elements, wherein each ticket element specifies:
a level identifier specifying a level of a set of levels supported by the ticket, a property identifier, and a setting value for a property associated with the property identifier.

14. The method of claim 13 wherein the set of levels includes distinct levels corresponding to: individual data elements, grouped data elements, and collections of grouped data elements.

15. The method of claim 12, wherein the operation comprises generating processed output based upon settings information provided by the ticket.

16. The method of claim 12, wherein the operation comprises generating displayable output.

17. The method of claim 12, wherein the operation comprises generating printer output.

18. The method of claim 12, wherein the level identifier is capable of designating a level from the set of levels including the second level, corresponding a page, and a first level corresponding to a document.

19. The method of claim 18 wherein the set of levels further includes a third level, above the first level, corresponding to a job.

20. A computer-readable storage medium having computer-executable instructions stored thereon for completing an operation according to a set of multilevel tickets associated with a set of hierarchically arranged content units comprising at least a first content unit at a first hierarchical level and a second content unit at a second hierarchical level, and wherein the first hierarchical level is higher than the second hierarchical level, the computer-executable instructions facilitating performing acts comprising:

applying, by a job manager during execution of an operation, a tree of properties to each multiple job tickets wherein the set of multilevel tickets comprises the multiple job tickets and the tree of properties of each job ticket comprising a set of ticket elements, wherein each ticket element comprises:

a level identifier specifying a scope prefix and a level of a set of levels within a content structure of a job supported by the ticket, and a property identifier designating a particular property applicable to the job, wherein the scope prefix specified by the level identifier is configured to define one or more levels of the set of levels to which a property specified in the property identifier is applicable, and facilitate determination of which level of the set of levels the property is allowed to appear, and configuring a print manager to allow a plurality of filters that perform a plurality of print request execution functions identified in a feature descriptor of a print device to register a plurality of feature supported by the plurality of filters, and support pipelining multiple filters of the plurality of filters, wherein:

the feature descriptor describes one or more capabilities associated with the print device, filter pipelining allows a stream of print jobs to pass through a set of designated one of the filters, wherein the tree of properties of each job ticket identifies which filter of the plurality of filters is to performs a function, and which filter of the plurality of filters is to allow a job associated with the job ticket to pass through without any processing, and at least one filter of the plurality of filters is configured to process different parts of the job associated with the job ticket in parallel.

21. The computer-readable storage medium of claim 20 wherein each ticket comprises:

a set of ticket elements, wherein each ticket element specifies:

a level identifier specifying a level of a set of levels supported by the ticket, a property identifier, and a setting value for a property associated with the property identifier.

22. The computer-readable storage medium of claim 21 wherein the set of levels includes distinct levels corresponding to: individual data elements, grouped data elements, and collections of grouped data elements.

23. The computer-readable storage medium of claim 21 wherein the operation comprises generating processed output based upon settings information provided by the ticket.

24. The computer-readable storage medium of claim 21 wherein the operation comprises generating displayable output.

25. The computer-readable storage medium of claim 21, wherein the operation comprises generating printer output.

26. The computer-readable storage medium of claim 22, wherein the level identifier is capable of designating a level from the set of levels including the second level, corresponding a page, and a first level corresponding to a document.

27. The computer-readable storage medium of claim 26 wherein the set of levels further includes a third level, above the first level, corresponding to the job.

* * * * *